(12) United States Patent
Liang et al.

(10) Patent No.: US 9,040,730 B2
(45) Date of Patent: May 26, 2015

(54) PURIFICATION OF TRIGLYCERIDE OIL FROM MICROBIAL SOURCES USING SHORT PATH DISTILLATION

(75) Inventors: Shu-Chien Liang, Newark, DE (US); Robert D Orlandi, Landenberg, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 480 days.

(21) Appl. No.: 13/370,785

(22) Filed: Feb. 10, 2012

(65) Prior Publication Data

US 2013/0046106 A1 Feb. 21, 2013

Related U.S. Application Data

(60) Provisional application No. 61/441,842, filed on Feb. 11, 2011.

(51) Int. Cl.
| | | |
|---|---|---|
| *C07C 51/43* | (2006.01) | |
| *B01D 3/12* | (2006.01) | |
| *A23L 1/30* | (2006.01) | |
| *C11B 1/10* | (2006.01) | |
| *C11B 3/12* | (2006.01) | |

(52) U.S. Cl.
CPC ................. *B01D 3/12* (2013.01); *A23L 1/3006* (2013.01); *C11B 1/104* (2013.01); *C11B 3/12* (2013.01)

(58) Field of Classification Search
CPC ........ A23L 1/3006; B01D 3/12; C11B 1/104; C11B 3/12
USPC ........................................................ 554/175
See application file for complete search history.

(56) References Cited

U.S. PATENT DOCUMENTS

| | | | |
|---|---|---|---|
| 2,874,171 A | 2/1959 | Nelson | |
| 4,293,220 A | 10/1981 | Denton et al. | |
| 5,401,646 A * | 3/1995 | Shinmen et al. | 435/134 |
| 6,166,230 A | 12/2000 | Bijl et al. | |
| 7,531,678 B2 * | 5/2009 | Choo et al. | 554/174 |
| 7,678,930 B2 | 3/2010 | Sondbo et al. | |
| 7,695,626 B2 | 4/2010 | Dueppen et al. | |
| 2002/0016317 A1 | 2/2002 | Schul et al. | |
| 2006/0110806 A1 | 5/2006 | Damude et al. | |
| 2006/0115881 A1 * | 6/2006 | Damude et al. | 435/134 |
| 2008/0107791 A1 | 5/2008 | Fichtali et al. | |
| 2008/0269329 A1 * | 10/2008 | Fujikawa et al. | 514/560 |
| 2010/0305341 A1 | 12/2010 | Bailey et al. | |
| 2011/0263709 A1 * | 10/2011 | Hutchenson et al. | 514/560 |

FOREIGN PATENT DOCUMENTS

EP 0442184 A1 8/1991

OTHER PUBLICATIONS

Flavourtech (2009), downloaded from inetrnet on Apr. 1, 2014.*
Lin et al., Short-Path Distillation of Palm Olein and Characterization of Products, Eur. J. Lipid Sci. Technol. vol. 111 (2009), pp. 142-147.
Breivik et al., Preparation of Highly Purified Concentrates of Eicosapentaenoic Acid and Docosahexaenoic Acid, JAOCS, vol. 74, No. 11 (1997), pp. 1425-1429.
Puah et al., Feature: Clearner Production Technologies for the Palm Oil Industry, Lipid Technology, vol. 19, No. 2 (2007), pp. 31-34.
Liang et al., Fractionation of Squid Visceral Oil Ethyl Esters by Short-Path Distillation, JAOCS, vol. 77, No. 7 (2000), pp. 773-777.

* cited by examiner

*Primary Examiner* — Yevegeny Valenrod
*Assistant Examiner* — Blaine G Doletski

(57) ABSTRACT

Disclosed is a process for reducing the amount of sterol in a sterol-containing microbial oil composition, including distilling, under short path distillation conditions, a sterol-containing microbial oil wherein said distillation produces a distillate fraction containing the sterol and a triacylglycerol-containing fraction having a reduced amount of the sterol when compared to the amount of sterol in the sterol-containing microbial oil composition that has not been subjected to short path distillation.

10 Claims, 2 Drawing Sheets

Figure 1:
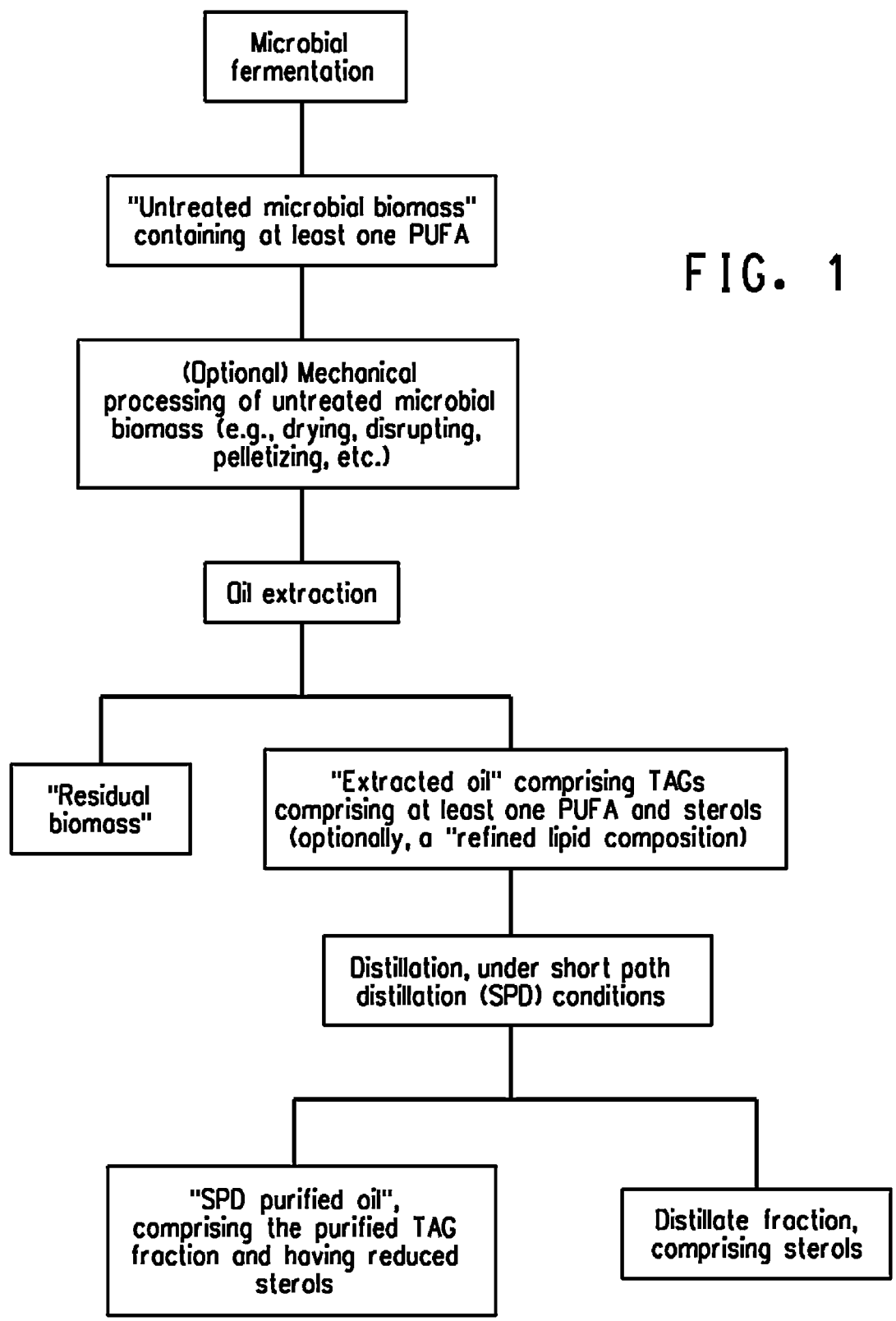

SEQUENCE LISTING

```
<160> NUMBER OF SEQ ID NOS: 8

<210> SEQ ID NO 1
<211> LENGTH: 4313
<212> TYPE: DNA
<213> ORGANISM: Artificial Sequence
<220> FEATURE:
<223> OTHER INFORMATION: Plasmid pZKUM

<400> SEQUENCE: 1
taatcgagct tggcgtaatc atggtcatag ctgtttcctg tgtgaaattg ttatccgctc      60
acaattccac acaacatacg agccggaagc ataaagtgta aagcctgggg tgcctaatga     120
gtgagctaac tcacattaat tgcgttgcgc tcactgcccg ctttccagtc gggaaacctg     180
tcgtgccagc tgcattaatg aatcggccaa cgcgcgggga gaggcggttt gcgtattggg     240
cgctcttccg cttcctcgct cactgactcg ctgcgctcgg tcgttcggct gcggcgagcg     300
```

```
gtatcagctc actcaaaggc ggtaatacgg ttatccacag aatcagggga taacgcagga      360
aagaacatgt gagcaaaagg ccagcaaaag gccaggaacc gtaaaaaggc cgcgttgctg      420 gcgttttttcc ataggctccg ccccctgac gagcatcaca aaaatcgacg ctcaagtcag      480
aggtggcgaa acccgacagg actataaaga taccaggcgt ttccccctgg aagctccctc      540
gtgcgctctc ctgttccgac cctgccgctt accggatacc tgtccgcctt tctcccttcg      600
ggaagcgtgg cgctttctca tagctcacgc tgtaggtatc tcagttcggt gtaggtcgtt      660
cgctccaagc tgggctgtgt gcacgaaccc cccgttcagc ccgaccgctg cgccttatcc      720
ggtaactatc gtcttgagtc caacccggta agacacgact tatcgccact ggcagcagcc      780
actggtaaca ggattagcag agcgaggtat gtaggcggtg ctacagagtt cttgaagtgg      840
tggcctaact acggctacac tagaaggaca gtatttggta tctgcgctct gctgaagcca      900
gttaccttcg aaaaagagt tggtagctct tgatccggca acaaaccac cgctggtagc      960 ggtggttttt tgtttgcaa gcagcagatt acgcgcagaa aaaaggatc tcaagaagat     1020 cctttgatct tttctacggg gtctgacgct cagtggaacg aaaactcacg ttaagggatt     1080
ttggtcatga gattatcaaa aaggatcttc acctagatcc ttttaaatta aaaatgaagt     1140
tttaaatcaa tctaaagtat atatgagtaa acttggtctg acagttacca atgcttaatc     1200
agtgaggcac ctatctcagc gatctgtcta tttcgttcat ccatagttgc ctgactcccc     1260
gtcgtgtaga taactacgat acgggagggc ttaccatctg gccccagtgc tgcaatgata     1320
ccgcgagacc cacgctcacc ggctccagat ttatcagcaa taaaccagcc agccggaagg     1380
gccgagcgca gaagtggtcc tgcaacttta tccgcctcca tccagtctat taattgttgc     1440
cgggaagcta gagtaagtag ttcgccagtt aatagtttgc gcaacgttgt tgccattgct     1500
acaggcatcg tggtgtcacg ctcgtcgttt ggtatggctt cattcagctc cggttcccaa     1560
cgatcaaggc gagttacatg atcccccatg ttgtgcaaaa aagcggttag ctccttcggt     1620
cctccgatcg ttgtcagaag taagttggcc gcagtgttat cactcatggt tatggcagca     1680
ctgcataatt ctcttactgt catgccatcc gtaagatgct tttctgtgac tggtgagtac     1740
tcaaccaagt cattctgaga atagtgtatg cggcgaccga gttgctcttg cccggcgtca     1800
atacgggata taccgcgcc acatagcaga actttaaaag tgctcatcat tggaaaacgt     1860
tcttcggggc gaaaactctc aaggatctta ccgctgttga tccagttc gatgtaaccc     1920 actcgtgcac ccaactgatc ttcagcatct tttactttca ccagcgtttc tgggtgagca     1980
aaaacaggaa ggcaaaatgc cgcaaaaaag gaataaggg cgacacggaa atgttgaata     2040
ctcatactct ccttttttca atattattga agcatttatc agggttattg tctcatgagc     2100
ggatacatat ttgaatgtat ttagaaaaat aaacaaatag ggttccgcg cacatttccc     2160 cgaaaagtgc cacctgacgc gccctgtagc ggcgcattaa gcgcggcggg tgtggtggtt     2220
acgcgcagcg tgaccgctac acttgccagc gccctagcgc ccgctccttt cgctttcttc     2280
ccttcctttc tcgccacgtt cgccggcttt ccccgtcaag ctctaaatcg gggctcccct     2340
ttagggttcc gatttagtgc tttacggcac ctcgacccca aaaaacttga ttagggtgat     2400
ggttcacgta gtgggccatc gccctgatag acggtttttc gccctttgac gttggagtcc     2460
acgttcttta atagtggact cttgttccaa actggaacaa cactcaaccc tatctcggtc     2520
tattcttttg atttataagg gattttgccg atttcggcct attggttaaa aaatgagctg     2580
atttaacaaa aatttaacgc gaattttaac aaaatattaa cgcttacaat tccattcgc      2640 cattcaggct gcgcaactgt tgggaagggc gatcggtgcg ggcctcttcg ctattacgcc     2700
```

```
agctggcgaa aggggatgt gctgcaaggc gattaagttg ggtaacgcca gggttttccc    2760
agtcacgacg ttgtaaaacg acggccagtg aattgtaata cgactcacta tagggcgaat    2820
tgggtaccgg gccccccctc gaggtcgacg agtatctgtc tgactcgtca ttgccgcctt    2880
tggagtacga ctccaactat gagtgtgctt ggatcacttt gacgatacat tcttcgttgg    2940
aggctgtggg tctgacagct gcgttttcgg cgcggttggc cgacaacaat atcagctgca    3000
acgtcattgc tggctttcat catgatcaca tttttgtcgg caaaggcgac gcccagagag    3060
ccattgacgt tctttctaat ttggaccgat agccgtatag tccagtctat ctataagttc    3120
aactaactcg taactattac cataacatat acttcactgc cccagataag gttccgataa    3180
aaagttctgc agactaaatt tatttcagtc tcctcttcac caccaaaatg ccctcctacg    3240
aagctcgagt gctcaagctc gtggcagcca agaaaaccaa cctgtgtgct tctctggatg    3300
ttaccaccac caaggagctc attgagcttg ccgataaggt cggaccttat gtgtgcatga    3360
tcaaaaccca tatcgacatc attgacgact tcacctacgc cggcactgtg ctcccctca    3420 aggaacttgc tcttaagcac ggtttcttcc tgttcgagga cagaaagttc gcagatattg    3480
gcaacactgt caagcaccag taccggtgtc accgaatcgc cgagtggtcc gatatcacca    3540
acgcccacgg tgtacccgga accggaatcg attgctggcc tgcgagctgg tgcgtacgag    3600
gaaactgtct ctgaacagaa gaaggaggac gtctctgact acgagaactc ccagtacaag    3660
gagttcctag tcccctctcc caacgagaag ctggccagag gtctgctcat gctggccgag    3720
ctgtcttgca agggctctct ggccactggc gagtactcca agcagaccat tgagcttgcc    3780
cgatccgacc ccgagtttgt ggttggcttc attgcccaga accgacctaa gggcgactct    3840
gaggactggc ttattctgac ccccggggtg ggtcttgacg acaagggaga cgctctcgga    3900
cagcagtacc gaactgttga ggatgtcatg tctaccggaa cggatatcat aattgtcggc    3960
cgaggtctgt acggccagaa ccgagatcct attgaggagg ccaagcgata ccagaaggct    4020
ggctgggagg cttaccagaa gattaactgt tagaggttag actatggata tgtaatttaa    4080
ctgtgtatat agagagcgtg caagtatgga gcgcttgttc agcttgtatg atggtcagac    4140
gacctgtctg atcgagtatg tatgatactg cacaacctgt gtatccgcat gatctgtcca    4200
atggggcatg ttgttgtgtt ctcgatacg gagatgctgg gtacagtgct aatacgttga    4260
actacttata cttatatgag gctcgaagaa agctgacttg tgtatgactt aat           4313
```

<210> SEQ ID NO 2
<211> LENGTH: 13565
<212> TYPE: DNA
<213> ORGANISM: Artificial Sequence
<220> FEATURE:
<223> OTHER INFORMATION: Plasmid pZKL3-9DP9N

<400> SEQUENCE: 2

```
gtacggattg tgtatgtccc tgtacctgca tcttgatgga gagagctccg gaaagcggat      60
caggagctgt ccaattttaa ttttataaca tggaaacgag tccttggagc tagaagacca     120 tttttttcaac tgccctatcg actatattta tctactccaa aaccgactgc ttcccaagaa    180
tcttcagcca aggcttccaa agtaaccccct cgcttcccga cacttaattg aaaccttaga    240
tgcagtcact gcgagtgaag tggactctaa catctccaac atagcgacga tattgcgagg    300
gtttgaatat aactaagatg catgatccat tacatttgta gaaatatcat aaacaacgaa    360
gcacatagac agaatgctgt tggttgttac atctgaagcc gaggtaccga tgtcattttc    420
```

-continued

| | |
|---|---|
| agctgtcact gcagagacag gggtatgtca catttgaaga tcatacaacc gacgtttatg | 480 |
| aaaaccagag atatagagaa tgtattgacg gttgtggcta tgtcataagt gcagtgaagt | 540 |
| gcagtgatta taggtatagt acacttactg tagctacaag tacatactgc tacagtaata | 600 |
| ctcatgtatg caaaccgtat tctgtgtcta cagaaggcga tacggaagag tcaatctctt | 660 |
| atgtagagcc atttctataa tcgaaggggc cttgtaattt ccaaacgagt aattgagtaa | 720 |
| ttgaagagca tcgtagacat tacttatcat gtattgtgag agggaggaga tgcagctgta | 780 |
| gctactgcac atactgtact cgcccatgca gggataatgc atagcgagac ttggcagtag | 840 |
| gtgacagttg ctagctgcta cttgtagtcg ggtgggtgat agcatggcgc gccagctgca | 900 |
| ttaatgaatc ggccaacgcg cggggagagg cggtttgcgt attgggcgct cttccgcttc | 960 |
| ctcgctcact gactcgctgc gctcggtcgt tcggctgcgg cgagcggtat cagctcactc | 1020 |
| aaaggcggta atacggttat ccacagaatc aggggataac gcaggaaaga acatgtgagc | 1080 |
| aaaaggccag caaaaggcca ggaaccgtaa aaaggccgcg ttgctggcgt ttttccatag | 1140 |
| gctccgcccc cctgacgagc atcacaaaaa tcgacgctca agtcagaggt ggcgaaaccc | 1200 |
| gacaggacta taaagatacc aggcgtttcc ccctggaagc tccctcgtgc gctctcctgt | 1260 |
| tccgaccctg ccgcttaccg gatacctgtc cgcctttctc ccttcgggaa gcgtggcgct | 1320 |
| ttctcatagc tcacgctgta ggtatctcag ttcggtgtag gtcgttcgct ccaagctggg | 1380 |
| ctgtgtgcac gaaccccccg ttcagcccga ccgctgcgcc ttatccggta actatcgtct | 1440 |
| tgagtccaac ccggtaagac acgacttatc gccactggca gcagccactg gtaacaggat | 1500 |
| tagcagagcg aggtatgtag gcggtgctac agagttcttg aagtggtggc ctaactacgg | 1560 |
| ctacactaga agaacagtat ttggtatctg cgctctgctg aagccagtta ccttcggaaa | 1620 |
| aagagttggt agctcttgat ccggcaaaca aaccaccgct ggtagcggtg gtttttttgt | 1680 |
| ttgcaagcag cagattacgc gcagaaaaaa aggatctcaa gaagatcctt tgatcttttc | 1740 |
| tacgggtct gacgctcagt ggaacgaaaa ctcacgttaa gggattttgg tcatgagatt | 1800 |
| atcaaaaagg atcttcacct agatcctttt aaattaaaaa tgaagtttta aatcaatcta | 1860 |
| aagtatatat gagtaaactt ggtctgacag ttaccaatgc ttaatcagtg aggcacctat | 1920 |
| ctcagcgatc tgtctatttc gttcatccat agttgcctga ctccccgtcg tgtagataac | 1980 |
| tacgatacgg gagggcttac catctggccc cagtgctgca atgataccgc gagacccacg | 2040 |
| ctcaccggct ccagatttat cagcaataaa ccagccagcc ggaagggccg agcgcagaag | 2100 |
| tggtcctgca actttatccg cctccatcca gtctattaat tgttgccggg aagctagagt | 2160 |
| aagtagttcg ccagttaata gtttgcgcaa cgttgttgcc attgctacag gcatcgtggt | 2220 |
| gtcacgctcg tcgtttggta tggcttcatt cagctccggt tcccaacgat caaggcgagt | 2280 |
| tacatgatcc cccatgttgt gcaaaaaagc ggttagctcc ttcggtcctc cgatcgttgt | 2340 |
| cagaagtaag ttggccgcag tgttatcact catggttatg gcagcactgc ataattctct | 2400 |
| tactgtcatg ccatccgtaa gatgcttttc tgtgactggt gagtactcaa ccaagtcatt | 2460 |
| ctgagaatag tgtatgcggc gaccgagttg ctcttgcccg gcgtcaatac gggataatac | 2520 |
| cgcgccacat agcagaactt taaaagtgct catcattgga aaacgttctt cggggcgaaa | 2580 |
| actctcaagg atcttaccgc tgttgagatc cagttcgatg taacccactc gtgcacccaa | 2640 |
| ctgatcttca gcatctttta ctttcaccag cgtttctggg tgagcaaaaa caggaaggca | 2700 |
| aaatgccgca aaaaagggaa taaggcgac acggaaatgt tgaatactca tactcttcct | 2760 |
| ttttcaatat tattgaagca tttatcaggg ttattgtctc atgagcggat acatatttga | 2820 |

```
atgtatttag aaaaataaac aaatagggt tccgcgcaca tttccccgaa aagtgccacc    2880
tgatgcggtg tgaaataccg cacagatgcg taaggagaaa ataccgcatc aggaaattgt    2940
aagcgttaat attttgttaa aattcgcgtt aaattttgt taaatcagct catttttaa    3000
ccaataggcc gaaatcggca aaatccctta taaatcaaaa gaatagaccg atagggtt    3060
gagtgttgtt ccagtttgga acaagagtcc actattaaag aacgtggact ccaacgtcaa    3120
agggcgaaaa accgtctatc agggcgatgg cccactacgt gaaccatcac ctaatcaag    3180
ttttttgggg tcgaggtgcc gtaaagcact aaatcggaac cctaaaggga gccccgatt    3240
tagagcttga cggggaaagc cggcgaacgt ggcgagaaag gaagggaaga aagcgaaagg    3300
agcgggcgct agggcgctgg caagtgtagc ggtcacgctg cgcgtaacca ccacacccgc    3360
cgcgcttaat gcgccgctac agggcgcgtc cattcgccat tcaggctgcg caactgttgg    3420
gaagggcgat cggtgcgggc ctcttcgcta ttacgccagc tggcgaaagg gggatgtgct    3480
gcaaggcgat taagttgggt aacgccaggg ttttcccagt cacgacgttg taaaacgacg    3540
gccagtgaat tgtaatacga ctcactatag ggcgaattgg gcccgacgtc gcatgcagga    3600
atagacatct tcaataggag cattaatacc tgtgggatca ctgatgtaaa cttctcccag    3660
agtatgtgaa taaccagcgg gccatccaac aaagaagtcg ttccagtgag tgactcggta    3720
catccgtctt tcggggttga tggtaagtcc gtcgtctcct tgcttaaaga acagagcgtc    3780
cacgtagtct gcaaaagcct tgtttccaag tcgaggctgc ccatagttga ttagcgttgg    3840
atcatatcca agattcttca ggttgatgcc catgaataga gcagtgacag ctcctagaga    3900
gtggccagtt acgatcaatt tgtagtcagt gttgtttcca aggaagtcga ccagacgatc    3960
ctgtacgttc accatagtct ctctgtatgc cttctgaaag ccatcatgaa cttggcagcc    4020
aggacaattg atactggcag aagggtttgt ggagtttatg tcagtagtgt taagaggagg    4080
gatactggtc atgtagggtt gttggatcgt ttggatgtca gtaatagcgt ctgcaatgga    4140
gaaagtgcct cggaaaacaa tatacttttc cttttggtg tgatcgtggg ccaaaaatcc    4200
agtaactgaa gtcgagaaga aatttcctcc aaactggtag tcaagagtca catcgggaaa    4260
atgagcgcaa gagtttccac aggtaaaatc gctctgcagg gcaaatgggc cagggctct    4320
gacacaatag gccacgttag atagccatcc gtacttgaga acaaagtcgt atgtctcctg    4380
ggtgatagga gccgttaatt aagttgcgac acatgtcttg atagtatctt gaattctctc    4440
tcttgagctt ttccataaca agttcttctg cctccaggaa gtccatgggt ggtttgatca    4500
tggttttggt gtagtggtag tgcagtggtg gtattgtgac tggggatgta gttgagaata    4560
agtcatacac aagtcagctt tcttcgagcc tcatataagt ataagtagtt caacgtatta    4620
gcactgtacc cagcatctcc gtatcgagaa acacaacaac atgccccatt ggacagatca    4680
tgcggataca caggttgtgc agtatcatac atactcgatc agacaggtcg tctgaccatc    4740
atacaagctg aacaagcgct ccatacttgc acgctctcta tatacacagt taaattacat    4800
atccatagtc taacctctaa cagttaatct tctggtaagc ctcccagcca gccttctggt    4860
atcgcttggc ctcctcaata ggatctcggt tctggccgta cagacctcgg ccgacaatta    4920
tgatatccgt tccggtagac atgacatcct caacagttcg gtactgctgt ccgagagcgt    4980
ctcccttgtc gtcaagaccc acccccgggg tcagaataag ccagtcctca gagtcgccct    5040
taggtcggtt ctgggcaatg aagccaacca caaactcggg gtcggatcgg gcaagctcaa    5100
tggtctgctt ggagtactcg ccagtggcca gagagccctt gcaagacagc tcggccagca    5160
```

```
tgagcagacc tctggccagc ttctcgttgg gagagggac taggaactcc ttgtactggg    5220
agttctcgta gtcagagacg tcctccttct tctgttcaga dacagtttcc tcggcaccag    5280
ctcgcaggcc agcaatgatt ccggttccgg gtacaccgtg ggcgttggtg atatcggacc    5340
actcggcgat tcggtgacac cggtactggt gcttgacagt gttgccaata tctgcgaact    5400
ttctgtcctc gaacaggaag aaaccgtgct taagagcaag ttccttgagg gggagcacag    5460
tgccggcgta ggtgaagtcg tcaatgatgt cgatatgggt tttgatcatg cacacataag    5520
gtccgacctt atcggcaagc tcaatgagct ccttggtggt ggtaacatcc agagaagcac    5580
acaggttggt tttcttggct gccacgagct tgagcactcg agcggcaaag gcggacttgt    5640
ggacgttagc tcgagcttcg taggagggca ttttggtggt gaagaggaga ctgaaataaa    5700
tttagtctgc agaacttttt atcggaacct tatctgggc agtgaagtat atgttatggt    5760
aatagttacg agttagttga acttatagat agactggact atacggctat cggtccaaat    5820
tagaaagaac gtcaatggct ctctgggcgt cgcctttgcc gacaaaaatg tgatcatgat    5880
gaaagccagc aatgacgttg cagctgatat tgttgtcggc caaccgcgcc gaaaacgcag    5940
ctgtcagacc cacagcctcc aacgaagaat gtatcgtcaa agtgatccaa gcacactcat    6000
agttggagtc gtactccaaa ggcggcaatg acgagtcaga cagatactcg tcgacctttt    6060
ccttgggaac caccaccgtc agcccttctg actcacgtat tgtagccacc gacacaggca    6120
acagtccgtg gatagcagaa tatgtcttgt cggtccattt ctcaccaact ttaggcgtca    6180
agtgaatgtt gcagaagaag tatgtgcctt cattgagaat cggtgttgct gatttcaata    6240
aagtcttgag atcagtttgg ccagtcatgt tgtgggggg aattggattg agttatcgcc    6300
tacagtctgt acaggtatac tcgctgccca ctttatactt tttgattccg ctgcacttga    6360
agcaatgtcg tttaccaaaa gtgagaatgc tccacagaac acaccccagg gtatggttga    6420
gcaaaaaata aacactccga tacggggaat cgaacccccgg tctccacggt tctcaagaag    6480
tattcttgat gagagcgtat cgatggttaa tgctgctgtg tgctgtgtgt gtgtgttgtt    6540
tggcgctcat tgttgcgtta tgcagcgtac accacaatat tggaagctta ttagccttc    6600 tatttttcg tttgcaaggc ttaacaacat tgctgtggag agggatggg atatggaggc    6660 cgctggaggg agtcggagag gcgttttga gcggcttggc ctggcgccca gctcgcgaaa    6720
cgcacctagg acccttttggc acgccgaaat gtgccacttt tcagtctagt aacgccttac    6780
ctacgtcatt ccatgcgtgc atgtttgcgc ctttttttccc ttgcccttga tcgccacaca    6840
gtacagtgca ctgtacagtg gaggttttgg ggggtctta gatgggagct aaaagcggcc    6900
tagcggtaca ctagtgggat tgtatggagt ggcatggagc ctaggtggag cctgacagga    6960
cgcacgaccg gctagcccgt gacagacgat gggtggctcc tgttgtccac cgcgtacaaa    7020
tgtttgggcc aaagtcttgt cagccttgct tgcgaaccta attcccaatt ttgtcacttc    7080 gcaccccat tgatcgagcc ctaacccctg cccatcaggc aatccaatta agctcgcatt    7140
gtctgccttg tttagtttgg ctcctgcccg tttcggcgtc cacttgcaca aacacaaaca    7200
agcattatat ataaggctcg tctctcccctc ccaaccacac tcactttttt gcccgtcttc    7260
ccttgctaac acaaaagtca agaacacaaa caaccacccc aaccccctta cacacaagac    7320
atatctacag caatggccat ggccaaaagc aaacgacggt cggaggctgt ggaagagcac    7380
gtgaccggct cggacgaggg cttgaccgat acttcgggtc acgtgagccc tgccgccaag    7440
aagcagaaga actcggagat tcatttcacc acccaggctg cccagcagtt ggatcgggag    7500
cgcaaggagg agtatctgga ctcgctgatc gacaacaagg actatctcaa gtaccgtcct    7560
```

```
cgaggctgga agctcaacaa cccgcctacc gaccgacctg tgcgaatcta cgccgatgga    7620
gtgtttgatt tgttccatct gggacacatg cgtcagctgg agcagtccaa gaaggccttc    7680
cccaacgcag tgttgattgt gggcattccc agcgacaagg agacccacaa gcggaaggga    7740
ttgaccgtgc tgagtgacgt ccagcggtac gagacggtgc gacactgcaa gtgggtggac    7800
gaggtggtgg aggatgctcc ctggtgtgtc accatggact ttctggaaaa acacaaaatc    7860
gactacgtgc cccatgacga tctgccctac gcttccggca acgacgatga tatctacaag    7920
cccatcaagg agaagggcat gtttctggcc acccagcgaa ccgagggcat tccacctcg    7980 gacatcatca ccaagattat ccgagactac gacaagtatt taatgcgaaa ctttgcccgg    8040
ggtgctaacc gaaaggatct caacgtctcg tggctcaaga gaacgagct ggacttcaag     8100 cgtcatgtgg ccgagttccg aaactcgttc aagcgaaaga aggtcggtaa ggatctctac    8160
ggcgagattc gcggtctgct gcagaatgtg ctcatttgga acggcgacaa ctccggcact    8220
tccactcccc agcgaaagac gctgcagacc aacgccaaga gatgtacat gaacgtgctc      8280 aagactctgc aggctcctga cgctgttgac gtggactcct cggagaacgt gtctgagaac    8340
gtcactgatg aggaggagga agacgacgac gaggttgatg aggacgaaga agccgacgac    8400
gacgacgaag acgacgaaga cgaggaagac gacgagtagg cggccgcatt gatgattgga    8460
aacacacaca tgggttatat ctaggtgaga gttagttgga cagttatata ttaaatcagc    8520
tatgccaacg gtaacttcat tcatgtcaac gaggaaccag tgactgcaag taatatagaa    8580
tttgaccacc ttgccattct cttgcactcc tttactatat ctcatttatt tcttatatac    8640
aaatcacttc ttcttcccag catcgagctc ggaaacctca tgagcaataa catcgtggat    8700
ctcgtcaata gagggctttt tggactcctt gctgttggcc accttgtcct tgctgtttaa    8760
acacgcagta ggatgtcctg cacgggtctt tttgtggggt gtggagaaag gggtgcttgg    8820
agatggaagc cggtagaacc gggctgcttg tgcttggaga tggaagccgg tagaaccggg    8880
ctgcttgggg ggatttgggg ccgctgggct ccaaagaggg gtaggcattt cgttggggtt    8940
acgtaattgc ggcatttggg tcctgcgcgc atgtcccatt ggtcagaatt agtccggata    9000
ggagacttat cagccaatca cagcgccgga tccacctgta ggttgggttg ggtgggagca    9060
cccctccaca gagtagagtc aaacagcagc agcaacatga tagttggggg tgtgcgtgtt    9120
aaaggaaaaa aagaagctt gggttatatt cccgctctat ttagaggttg cgggatagac     9180
gccgacggag ggcaatggcg ctatggaacc ttgcggatat ccatacgccg cggcggactg    9240
cgtccgaacc agctccagca gcgttttttc cgggccattg agccgactgc gaccccgcca    9300
acgtgtcttg gcccacgcac tcatgtcatg ttggtgttgg gaggccactt tttaagtagc    9360
acaaggcacc tagctcgcag caaggtgtcc gaaccaaaga agcggctgca gtggtgcaaa    9420
cggggcggaa acggcgggaa aaagccacgg gggcacgaat tgaggcacgc cctcgaattt    9480
gagacgagtc acgccccat tcgcccgcgc aatggctcgc caacgcccgg tcttttgcac     9540
cacatcaggt tacccccaagc caaacctttg tgttaaaaag cttaacatat tataccgaac    9600
gtaggtttgg gcgggcttgc tccgtctgtc caaggcaaca tttatataag ggtctgcatc    9660
gccggctcaa ttgaatcttt tttcttcttc tcttctctat attcattctt gaattaaaca    9720
cacatcaaca tggccatcaa agtcggtatt aacggattcg ggcgaatcgg acgaattgtg    9780
agtaccatag aaggtgatgg aaacatgacc aacagaaac agatgacaag tgtcatcgac     9840
ccaccagagc ccaattgagc tcatactaac agtcgacaac ctgtcgaacc aattgatgac    9900
```

| | |
|---|---|
| tccccgacaa tgtactaaca caggtcctgc ccatggtgaa aaacgtggac caagtggatc | 9960 |
| tctcgcaggt cgacaccatt gcctccggcc gagatgtcaa ctacaaggtc aagtacacct | 10020 |
| ccggcgttaa gatgagccag ggcgcctacg acgacaaggg ccgccacatt tccgagcagc | 10080 |
| ccttcacctg gccaactgg caccagcaca tcaactggct caacttcatt ctggtgattg | 10140 |
| cgctgcctct gtcgtccttt gctgccgctc ccttcgtctc cttcaactgg aagaccgccg | 10200 |
| cgtttgctgt cggctattac atgtgcaccg gtctcggtat caccgccggc taccaccgaa | 10260 |
| tgtgggccca tcgagcctac aaggccgctc tgcccgttcg aatcatcctt gctctgtttg | 10320 |
| gaggaggagc tgtcgagggc tccatccgat ggtgggcctc gtctcaccga gtccaccacc | 10380 |
| gatggaccga ctccaacaag gacccttacg acgcccgaaa gggattctgg ttctcccact | 10440 |
| ttggctggat gctgcttgtg cccaacccca agaacaaggg ccgaactgac atttctgacc | 10500 |
| tcaacaacga ctgggttgtc cgactccagc acaagtacta cgtttacgtt ctcgtcttca | 10560 |
| tggccattgt tctgcccacc ctcgtctgtg gctttggctg gggcgactgg aagggaggtc | 10620 |
| ttgtctacgc cggtatcatg cgatacacct ttgtgcagca ggtgactttc tgtgtcaact | 10680 |
| cccttgccca ctggattgga gagcagccct tcgacgaccg acgaactccc cgagaccacg | 10740 |
| ctcttaccgc cctggtcacc tttgagagg gctaccacaa cttccaccac gagttcccct | 10800 |
| cggactaccg aaacgccctc atctggtacc agtacgaccc caccaagtgg ctcatctgga | 10860 |
| ccctcaagca ggttggtctc gcctgggacc tccagacctt ctcccagaac gccatcgagc | 10920 |
| agggtctcgt gcagcagcga cagaagaagc tggacaagtg cgaaacaac ctcaactggg | 10980 |
| gtatccccat tgagcagctg cctgtcattg agtttgagga gttccaagag caggccaaga | 11040 |
| cccgagatct ggttctcatt tctggcattg tccacgacgt gtctgccttt gtcgagcacc | 11100 |
| accctggtgg aaaggccctc attatgagcg ccgtcggcaa ggacggtacc gctgtcttca | 11160 |
| acggaggtgt ctaccgacac tccaacgctg gccacaacct gcttgccacc atgcgagttt | 11220 |
| cggtcattcg aggcggcatg gaggttgagg tgtggaagac tgcccagaac gaaaagaagg | 11280 |
| accagaacat tgtctccgat gagagtggaa accgaatcca ccgagctggt ctccaggcca | 11340 |
| cccgggtcga gaaccccggt atgtctggca tggctgctta gcggccgca tgaagaagata | 11400 |
| aatatataaa tacattgaga tattaaatgc gctagattag agagcctcat actgctcgga | 11460 |
| gagaagccaa gacgagtact caaaggggat tacaccatcc atatccacag acacaagctg | 11520 |
| gggaaaggtt ctatatacac tttccggaat accgtagttt ccgatgttat caatggggc | 11580 |
| agccaggatt tcaggcactt cggtgtctcg gggtgaaatg gcgttcttgg cctccatcaa | 11640 |
| gtcgtaccat gtcttcattt gcctgtcaaa gtaaaacaga agcagatgaa gaatgaactt | 11700 |
| gaagtgaagg aatttaaata gttggagcaa gggagaaatg tagagtgtga aagactcact | 11760 |
| atggtccggg cttatctcga ccaatagcca aagtctggag tttctgagag aaaaaggcaa | 11820 |
| gatacgtatg taacaaagcg acgcatggta caataatacc ggaggcatgt atcatagaga | 11880 |
| gttagtggtt cgatgatggc actggtgcct ggtatgactt tatacggctg actacatatt | 11940 |
| tgtcctcaga catacaatta cagtcaagca cttacccttg gacatctgta ggtaccccc | 12000 |
| ggccaagacg atctcagcgt gtcgtatgtc ggattggcgt agctccctcg ctcgtcaatt | 12060 |
| ggctcccatc tactttcttc tgcttggcta cacccagcat gtctgctatg gctcgttttc | 12120 |
| gtgccttatc tatcctccca gtattaccaa ctctaaatga catgatgtga ttgggtctac | 12180 |
| actttcatat cagagataag gagtagcaca gttgcataaa aagcccaact ctaatcagct | 12240 |
| tcttcctttc ttgtaattag tacaaaggtg attagcgaaa tctggaagct tagttggccc | 12300 |

-continued

```
taaaaaaatc aaaaaaagca aaaaacgaaa aacgaaaaac cacagttttg agaacaggga    12360
ggtaacgaag gatcgtatat atatatatat atatatatac ccacggatcc cgagaccggc    12420
ctttgattct tccctacaac caaccattct caccaccta  attcacaacc atggaggtcg    12480
tgaacgaaat cgtctccatt ggccaggagg ttcttcccaa ggtcgactat gctcagctct    12540
ggtctgatgc ctcgcactgc gaggtgctgt acctctccat cgccttcgtc atcctgaagt    12600
tcacccttgg tcctctcgga cccaagggtc agtctcgaat gaagtttgtg ttcaccaact    12660
acaacctgct catgtccatc tactcgctgg gctccttcct ctctatggcc tacgccatgt    12720
acaccattgg tgtcatgtcc gacaactgcg agaaggcttt cgacaacaat gtcttccgaa    12780
tcaccactca gctgttctac ctcagcaagt cctcgagta  cattgactcc ttctatctgc    12840
ccctcatggg caagcctctg acctggttgc agttctttca ccatctcgga gctcctatgg    12900
acatgtggct gttctacaac taccgaaacg aagccgtttg gatctttgtg ctgctcaacg    12960
gcttcattca ctggatcatg tacggctact attggacccg actgatcaag ctcaagttcc    13020
ctatgcccaa gtccctgatt acttctatgc agatcattca gttcaacgtt ggcttctaca    13080
tcgtctggaa gtaccggaac attccctgct accgacaaga tggaatgaga atgtttggct    13140
ggttttttcaa ctacttctac gttggtactg tcctgtgtct gttcctcaac ttctacgtgc    13200
agacctacat cgtccgaaag cacaagggag ccaaaaagat tcagtgagcg ccgcaagtg    13260
tggatgggga agtgagtgcc cggttctgtg tgcacaattg gcaatccaag atggatggat    13320
tcaacacagg gatatagcga gctacgtggt ggtgcgagga tatagcaacg gatatttatg    13380
tttgacactt gagaatgtac gatacaagca ctgtccaagt acaatactaa acatactgta    13440
catactcata ctcgtacccg gcaacggttt cacttgagtg cagtggctag tgctcttact    13500
cgtacagtgt gcaatactgc gtatcatagt ctttgatgta tatcgtattc attcatgtta    13560
gttgc                                                                13565
```

<210> SEQ ID NO 3
<211> LENGTH: 777
<212> TYPE: DNA
<213> ORGANISM: Euglena gracilis
<220> FEATURE:
<221> NAME/KEY: CDS
<222> LOCATION: (1)..(777)
<223> OTHER INFORMATION: mutant delta-9 elongase "EgD9eS-L35G"

<400> SEQUENCE: 3

```
atg gag gtc gtg aac gaa atc gtc tcc att ggc cag gag gtt ctt ccc     48
Met Glu Val Val Asn Glu Ile Val Ser Ile Gly Gln Glu Val Leu Pro
1               5                   10                  15 aag gtc gac tat gct cag ctc tgg tct gat gcc tcg cac tgc gag gtg     96
Lys Val Asp Tyr Ala Gln Leu Trp Ser Asp Ala Ser His Cys Glu Val
            20                  25                  30 ctg tac ggg tcc atc gcc ttc gtc atc ctg aag ttc acc ctt ggt cct    144
Leu Tyr Gly Ser Ile Ala Phe Val Ile Leu Lys Phe Thr Leu Gly Pro
        35                  40                  45 ctc gga ccc aag ggt cag tct cga atg aag ttt gtg ttc acc aac tac    192
Leu Gly Pro Lys Gly Gln Ser Arg Met Lys Phe Val Phe Thr Asn Tyr
    50                  55                  60 aac ctg ctc atg tcc atc tac tcg ctg ggc tcc ttc ctc tct atg gcc    240
Asn Leu Leu Met Ser Ile Tyr Ser Leu Gly Ser Phe Leu Ser Met Ala
65                  70                  75                  80 tac gcc atg tac acc att ggt gtc atg tcc gac aac tgc gag aag gct    288
Tyr Ala Met Tyr Thr Ile Gly Val Met Ser Asp Asn Cys Glu Lys Ala
```

```
                         85                  90                  95
ttc gac aac aat gtc ttc cga atc acc act cag ctg ttc tac ctc agc      336
Phe Asp Asn Asn Val Phe Arg Ile Thr Thr Gln Leu Phe Tyr Leu Ser
                100                 105                 110 aag ttc ctc gag tac att gac tcc ttc tat ctg ccc ctc atg ggc aag      384
Lys Phe Leu Glu Tyr Ile Asp Ser Phe Tyr Leu Pro Leu Met Gly Lys
            115                 120                 125 cct ctg acc tgg ttg cag ttc ttt cac cat ctc gga gct cct atg gac      432
Pro Leu Thr Trp Leu Gln Phe Phe His His Leu Gly Ala Pro Met Asp
        130                 135                 140 atg tgg ctg ttc tac aac tac cga aac gaa gcc gtt tgg atc ttt gtg      480
Met Trp Leu Phe Tyr Asn Tyr Arg Asn Glu Ala Val Trp Ile Phe Val
145                 150                 155                 160 ctg ctc aac ggc ttc att cac tgg atc atg tac ggc tac tat tgg acc      528
Leu Leu Asn Gly Phe Ile His Trp Ile Met Tyr Gly Tyr Tyr Trp Thr
                165                 170                 175 cga ctg atc aag ctc aag ttc cct atg ccc aag tcc ctg att act tct      576
Arg Leu Ile Lys Leu Lys Phe Pro Met Pro Lys Ser Leu Ile Thr Ser
            180                 185                 190 atg cag atc att cag ttc aac gtt ggc ttc tac atc gtc tgg aag tac      624
Met Gln Ile Ile Gln Phe Asn Val Gly Phe Tyr Ile Val Trp Lys Tyr
        195                 200                 205 cgg aac att ccc tgc tac cga caa gat gga atg aga atg ttt ggc tgg      672
Arg Asn Ile Pro Cys Tyr Arg Gln Asp Gly Met Arg Met Phe Gly Trp
210                 215                 220 ttt ttc aac tac ttc tac gtt ggt act gtc ctg tgt ctg ttc ctc aac      720
Phe Phe Asn Tyr Phe Tyr Val Gly Thr Val Leu Cys Leu Phe Leu Asn
225                 230                 235                 240 ttc tac gtg cag acc tac atc gtc cga aag cac aag gga gcc aaa aag      768
Phe Tyr Val Gln Thr Tyr Ile Val Arg Lys His Lys Gly Ala Lys Lys
                245                 250                 255 att cag tga                                                          777
Ile Gln <210> SEQ ID NO 4
<211> LENGTH: 258
<212> TYPE: PRT
<213> ORGANISM: Euglena gracilis

<400> SEQUENCE: 4

Met Glu Val Val Asn Glu Ile Val Ser Ile Gly Gln Glu Val Leu Pro
1               5                   10                  15

Lys Val Asp Tyr Ala Gln Leu Trp Ser Asp Ala Ser His Cys Glu Val
            20                  25                  30

Leu Tyr Gly Ser Ile Ala Phe Val Ile Leu Lys Phe Thr Leu Gly Pro
        35                  40                  45

Leu Gly Pro Lys Gly Gln Ser Arg Met Lys Phe Val Phe Thr Asn Tyr
    50                  55                  60

Asn Leu Leu Met Ser Ile Tyr Ser Leu Gly Ser Phe Leu Ser Met Ala
65                  70                  75                  80

Tyr Ala Met Tyr Thr Ile Gly Val Met Ser Asp Asn Cys Glu Lys Ala
                85                  90                  95

Phe Asp Asn Asn Val Phe Arg Ile Thr Thr Gln Leu Phe Tyr Leu Ser
            100                 105                 110

Lys Phe Leu Glu Tyr Ile Asp Ser Phe Tyr Leu Pro Leu Met Gly Lys
        115                 120                 125

Pro Leu Thr Trp Leu Gln Phe Phe His His Leu Gly Ala Pro Met Asp
    130                 135                 140
```

```
Met Trp Leu Phe Tyr Asn Tyr Arg Asn Glu Ala Val Trp Ile Phe Val
145                 150                 155                 160

Leu Leu Asn Gly Phe Ile His Trp Ile Met Tyr Gly Tyr Tyr Trp Thr
                165                 170                 175

Arg Leu Ile Lys Leu Lys Phe Pro Met Pro Lys Ser Leu Ile Thr Ser
            180                 185                 190

Met Gln Ile Ile Gln Phe Asn Val Gly Phe Tyr Ile Val Trp Lys Tyr
        195                 200                 205

Arg Asn Ile Pro Cys Tyr Arg Gln Asp Gly Met Arg Met Phe Gly Trp
    210                 215                 220

Phe Phe Asn Tyr Phe Tyr Val Gly Thr Val Leu Cys Leu Phe Leu Asn
225                 230                 235                 240

Phe Tyr Val Gln Thr Tyr Ile Val Arg Lys His Lys Gly Ala Lys Lys
                245                 250                 255

Ile Gln

<210> SEQ ID NO 5
<211> LENGTH: 1449
<212> TYPE: DNA
<213> ORGANISM: Yarrowia lipolytica
<220> FEATURE:
<221> NAME/KEY: CDS
<222> LOCATION: (1)..(1449)
<223> OTHER INFORMATION: delta-9 desaturase; GenBank Accession No.
      XM_501496

<400> SEQUENCE: 5 atg gtg aaa aac gtg gac caa gtg gat ctc tcg cag gtc gac acc att      48
Met Val Lys Asn Val Asp Gln Val Asp Leu Ser Gln Val Asp Thr Ile
1               5                   10                  15 gcc tcc ggc cga gat gtc aac tac aag gtc aag tac acc tcc ggc gtt      96
Ala Ser Gly Arg Asp Val Asn Tyr Lys Val Lys Tyr Thr Ser Gly Val
            20                  25                  30 aag atg agc cag ggc gcc tac gac gac aag ggc cgc cac att tcc gag     144
Lys Met Ser Gln Gly Ala Tyr Asp Asp Lys Gly Arg His Ile Ser Glu
        35                  40                  45 cag ccc ttc acc tgg gcc aac tgg cac cag cac atc aac tgg ctc aac     192
Gln Pro Phe Thr Trp Ala Asn Trp His Gln His Ile Asn Trp Leu Asn
    50                  55                  60 ttc att ctg gtg att gcg ctg cct ctg tcg tcc ttt gct gcc gct ccc     240
Phe Ile Leu Val Ile Ala Leu Pro Leu Ser Ser Phe Ala Ala Ala Pro
65                  70                  75                  80 ttc gtc tcc ttc aac tgg aag acc gcg gcg ttt gct gtc ggc tat tac     288
Phe Val Ser Phe Asn Trp Lys Thr Ala Ala Phe Ala Val Gly Tyr Tyr
                85                  90                  95 atg tgc acc ggt ctc ggt atc acc gcc ggc tac cac cga atg tgg gcc     336
Met Cys Thr Gly Leu Gly Ile Thr Ala Gly Tyr His Arg Met Trp Ala
            100                 105                 110 cat cga gcc tac aag gcc gct ctg ccc gtt cga atc atc ctt gct ctg     384
His Arg Ala Tyr Lys Ala Ala Leu Pro Val Arg Ile Ile Leu Ala Leu
        115                 120                 125 ttt gga gga gga gct gtc gag ggc tcc atc cga tgg tgg gcc tcg tct     432
Phe Gly Gly Gly Ala Val Glu Gly Ser Ile Arg Trp Trp Ala Ser Ser
    130                 135                 140 cac cga gtc cac cac cga tgg acc gac tcc aac aag gac cct tac gac     480
His Arg Val His His Arg Trp Thr Asp Ser Asn Lys Asp Pro Tyr Asp
145                 150                 155                 160 gcc cga aag gga ttc tgg ttc tcc cac ttt ggc tgg atg ctg ctt gtg     528
Ala Arg Lys Gly Phe Trp Phe Ser His Phe Gly Trp Met Leu Leu Val
```

|     |     |     |     |     |     | 165 |     |     |     | 170 |     |     |     | 175 |     |     |      |
|-----|-----|-----|-----|-----|-----|-----|-----|-----|-----|-----|-----|-----|-----|-----|-----|-----|------|
| ccc | aac | ccc | aag | aac | aag | ggc | cga | act | gac | att | tct | gac | ctc | aac | aac |     | 576  |
| Pro | Asn | Pro | Lys | Asn | Lys | Gly | Arg | Thr | Asp | Ile | Ser | Asp | Leu | Asn | Asn |     |      |
|     |     |     | 180 |     |     |     |     | 185 |     |     |     |     | 190 |     |     |     |      |

| gac | tgg | gtt | gtc | cga | ctc | cag | cac | aag | tac | tac | gtt | tac | gtt | ctc | gtc | 624 |
|-----|-----|-----|-----|-----|-----|-----|-----|-----|-----|-----|-----|-----|-----|-----|-----|-----|
| Asp | Trp | Val | Val | Arg | Leu | Gln | His | Lys | Tyr | Tyr | Val | Tyr | Val | Leu | Val |     |
|     |     | 195 |     |     |     |     | 200 |     |     |     |     | 205 |     |     |     |     |

| ttc | atg | gcc | att | gtt | ctg | ccc | acc | ctc | gtc | tgt | ggc | ttt | ggc | tgg | ggc | 672 |
|-----|-----|-----|-----|-----|-----|-----|-----|-----|-----|-----|-----|-----|-----|-----|-----|-----|
| Phe | Met | Ala | Ile | Val | Leu | Pro | Thr | Leu | Val | Cys | Gly | Phe | Gly | Trp | Gly |     |
|     | 210 |     |     |     |     | 215 |     |     |     |     | 220 |     |     |     |     |     |

| gac | tgg | aag | gga | ggt | ctt | gtc | tac | gcc | ggt | atc | atg | cga | tac | acc | ttt | 720 |
|-----|-----|-----|-----|-----|-----|-----|-----|-----|-----|-----|-----|-----|-----|-----|-----|-----|
| Asp | Trp | Lys | Gly | Gly | Leu | Val | Tyr | Ala | Gly | Ile | Met | Arg | Tyr | Thr | Phe |     |
| 225 |     |     |     | 230 |     |     |     |     | 235 |     |     |     |     | 240 |     |     |

| gtg | cag | cag | gtg | act | ttc | tgt | gtc | aac | tcc | ctt | gcc | cac | tgg | att | gga | 768 |
|-----|-----|-----|-----|-----|-----|-----|-----|-----|-----|-----|-----|-----|-----|-----|-----|-----|
| Val | Gln | Gln | Val | Thr | Phe | Cys | Val | Asn | Ser | Leu | Ala | His | Trp | Ile | Gly |     |
|     |     |     |     | 245 |     |     |     |     | 250 |     |     |     |     | 255 |     |     |

| gag | cag | ccc | ttc | gac | gac | cga | cga | act | ccc | cga | gac | cac | gct | ctt | acc | 816 |
|-----|-----|-----|-----|-----|-----|-----|-----|-----|-----|-----|-----|-----|-----|-----|-----|-----|
| Glu | Gln | Pro | Phe | Asp | Asp | Arg | Arg | Thr | Pro | Arg | Asp | His | Ala | Leu | Thr |     |
|     |     |     |     | 260 |     |     |     |     | 265 |     |     |     |     | 270 |     |     |

| gcc | ctg | gtc | acc | ttt | gga | gag | ggc | tac | cac | aac | ttc | cac | cac | gag | ttc | 864 |
|-----|-----|-----|-----|-----|-----|-----|-----|-----|-----|-----|-----|-----|-----|-----|-----|-----|
| Ala | Leu | Val | Thr | Phe | Gly | Glu | Gly | Tyr | His | Asn | Phe | His | His | Glu | Phe |     |
|     |     |     | 275 |     |     |     |     | 280 |     |     |     |     | 285 |     |     |     |

| ccc | tcg | gac | tac | cga | aac | gcc | ctc | atc | tgg | tac | cag | tac | gac | ccc | acc | 912 |
|-----|-----|-----|-----|-----|-----|-----|-----|-----|-----|-----|-----|-----|-----|-----|-----|-----|
| Pro | Ser | Asp | Tyr | Arg | Asn | Ala | Leu | Ile | Trp | Tyr | Gln | Tyr | Asp | Pro | Thr |     |
|     | 290 |     |     |     |     | 295 |     |     |     |     | 300 |     |     |     |     |     |

| aag | tgg | ctc | atc | tgg | acc | ctc | aag | cag | gtt | ggt | ctc | gcc | tgg | gac | ctc | 960 |
|-----|-----|-----|-----|-----|-----|-----|-----|-----|-----|-----|-----|-----|-----|-----|-----|-----|
| Lys | Trp | Leu | Ile | Trp | Thr | Leu | Lys | Gln | Val | Gly | Leu | Ala | Trp | Asp | Leu |     |
| 305 |     |     |     |     | 310 |     |     |     |     | 315 |     |     |     |     | 320 |     |

| cag | acc | ttc | tcc | cag | aac | gcc | atc | gag | cag | ggt | ctc | gtg | cag | cag | cga | 1008 |
|-----|-----|-----|-----|-----|-----|-----|-----|-----|-----|-----|-----|-----|-----|-----|-----|------|
| Gln | Thr | Phe | Ser | Gln | Asn | Ala | Ile | Glu | Gln | Gly | Leu | Val | Gln | Gln | Arg |      |
|     |     |     |     | 325 |     |     |     |     | 330 |     |     |     |     | 335 |     |      |

| cag | aag | aag | ctg | gac | aag | tgg | cga | aac | aac | ctc | aac | tgg | ggt | atc | ccc | 1056 |
|-----|-----|-----|-----|-----|-----|-----|-----|-----|-----|-----|-----|-----|-----|-----|-----|------|
| Gln | Lys | Lys | Leu | Asp | Lys | Trp | Arg | Asn | Asn | Leu | Asn | Trp | Gly | Ile | Pro |      |
|     |     |     | 340 |     |     |     |     | 345 |     |     |     |     | 350 |     |     |      |

| att | gag | cag | ctg | cct | gtc | att | gag | ttt | gag | gag | ttc | caa | gag | cag | gcc | 1104 |
|-----|-----|-----|-----|-----|-----|-----|-----|-----|-----|-----|-----|-----|-----|-----|-----|------|
| Ile | Glu | Gln | Leu | Pro | Val | Ile | Glu | Phe | Glu | Glu | Phe | Gln | Glu | Gln | Ala |      |
|     |     | 355 |     |     |     |     | 360 |     |     |     |     | 365 |     |     |     |      |

| aag | acc | cga | gat | ctg | gtt | ctc | att | tct | ggc | att | gtc | cac | gac | gtg | tct | 1152 |
|-----|-----|-----|-----|-----|-----|-----|-----|-----|-----|-----|-----|-----|-----|-----|-----|------|
| Lys | Thr | Arg | Asp | Leu | Val | Leu | Ile | Ser | Gly | Ile | Val | His | Asp | Val | Ser |      |
|     | 370 |     |     |     |     | 375 |     |     |     |     | 380 |     |     |     |     |      |

| gcc | ttt | gtc | gag | cac | cac | cct | ggt | gga | aag | gcc | ctc | att | atg | agc | gcc | 1200 |
|-----|-----|-----|-----|-----|-----|-----|-----|-----|-----|-----|-----|-----|-----|-----|-----|------|
| Ala | Phe | Val | Glu | His | His | Pro | Gly | Gly | Lys | Ala | Leu | Ile | Met | Ser | Ala |      |
| 385 |     |     |     |     | 390 |     |     |     |     | 395 |     |     |     |     | 400 |      |

| gtc | ggc | aag | gac | ggt | acc | gct | gtc | ttc | aac | gga | ggt | gtc | tac | cga | cac | 1248 |
|-----|-----|-----|-----|-----|-----|-----|-----|-----|-----|-----|-----|-----|-----|-----|-----|------|
| Val | Gly | Lys | Asp | Gly | Thr | Ala | Val | Phe | Asn | Gly | Gly | Val | Tyr | Arg | His |      |
|     |     |     |     | 405 |     |     |     |     | 410 |     |     |     |     | 415 |     |      |

| tcc | aac | gct | ggc | cac | aac | ctg | ctt | gcc | acc | atg | cga | gtt | tcg | gtc | att | 1296 |
|-----|-----|-----|-----|-----|-----|-----|-----|-----|-----|-----|-----|-----|-----|-----|-----|------|
| Ser | Asn | Ala | Gly | His | Asn | Leu | Leu | Ala | Thr | Met | Arg | Val | Ser | Val | Ile |      |
|     |     |     | 420 |     |     |     |     | 425 |     |     |     |     | 430 |     |     |      |

| cga | ggc | ggc | atg | gag | gtt | gag | gtg | tgg | aag | act | gcc | cag | aac | gaa | aag | 1344 |
|-----|-----|-----|-----|-----|-----|-----|-----|-----|-----|-----|-----|-----|-----|-----|-----|------|
| Arg | Gly | Gly | Met | Glu | Val | Glu | Val | Trp | Lys | Thr | Ala | Gln | Asn | Glu | Lys |      |
|     |     | 435 |     |     |     |     | 440 |     |     |     |     | 445 |     |     |     |      |

| aag | gac | cag | aac | att | gtc | tcc | gat | gag | agt | gga | aac | cga | atc | cac | cga | 1392 |
|-----|-----|-----|-----|-----|-----|-----|-----|-----|-----|-----|-----|-----|-----|-----|-----|------|
| Lys | Asp | Gln | Asn | Ile | Val | Ser | Asp | Glu | Ser | Gly | Asn | Arg | Ile | His | Arg |      |
|     | 450 |     |     |     |     | 455 |     |     |     |     | 460 |     |     |     |     |      |

| gct | ggt | ctc | cag | gcc | acc | cgg | gtc | gag | aac | ccc | ggt | atg | tct | ggc | atg | 1440 |
|-----|-----|-----|-----|-----|-----|-----|-----|-----|-----|-----|-----|-----|-----|-----|-----|------|
| Ala | Gly | Leu | Gln | Ala | Thr | Arg | Val | Glu | Asn | Pro | Gly | Met | Ser | Gly | Met |      |
| 465 |     |     |     |     | 470 |     |     |     |     | 475 |     |     |     |     | 480 |      |

| gct | gct | tag |     |     |     |     |     |     |     |     |     |     |     |     |     | 1449 |
|-----|-----|-----|-----|-----|-----|-----|-----|-----|-----|-----|-----|-----|-----|-----|-----|------|

Ala Ala

<210> SEQ ID NO 6
<211> LENGTH: 482
<212> TYPE: PRT
<213> ORGANISM: Yarrowia lipolytica

<400> SEQUENCE: 6

```
Met Val Lys Asn Val Asp Gln Val Asp Leu Ser Gln Val Asp Thr Ile
1               5                   10                  15

Ala Ser Gly Arg Asp Val Asn Tyr Lys Val Lys Tyr Thr Ser Gly Val
            20                  25                  30

Lys Met Ser Gln Gly Ala Tyr Asp Asp Lys Gly Arg His Ile Ser Glu
        35                  40                  45

Gln Pro Phe Thr Trp Ala Asn Trp His Gln His Ile Asn Trp Leu Asn
    50                  55                  60

Phe Ile Leu Val Ile Ala Leu Pro Leu Ser Ser Phe Ala Ala Pro
65                  70                  75                  80

Phe Val Ser Phe Asn Trp Lys Thr Ala Ala Phe Ala Val Gly Tyr Tyr
                85                  90                  95

Met Cys Thr Gly Leu Gly Ile Thr Ala Gly Tyr His Arg Met Trp Ala
            100                 105                 110

His Arg Ala Tyr Lys Ala Ala Leu Pro Val Arg Ile Ile Leu Ala Leu
        115                 120                 125

Phe Gly Gly Gly Ala Val Glu Gly Ser Ile Arg Trp Trp Ala Ser Ser
    130                 135                 140

His Arg Val His His Arg Trp Thr Asp Ser Asn Lys Asp Pro Tyr Asp
145                 150                 155                 160

Ala Arg Lys Gly Phe Trp Phe Ser His Phe Gly Trp Met Leu Leu Val
                165                 170                 175

Pro Asn Pro Lys Asn Lys Gly Arg Thr Asp Ile Ser Asp Leu Asn Asn
            180                 185                 190

Asp Trp Val Val Arg Leu Gln His Lys Tyr Tyr Val Tyr Val Leu Val
        195                 200                 205

Phe Met Ala Ile Val Leu Pro Thr Leu Val Cys Gly Phe Gly Trp Gly
    210                 215                 220

Asp Trp Lys Gly Gly Leu Val Tyr Ala Gly Ile Met Arg Tyr Thr Phe
225                 230                 235                 240

Val Gln Gln Val Thr Phe Cys Val Asn Ser Leu Ala His Trp Ile Gly
                245                 250                 255

Glu Gln Pro Phe Asp Asp Arg Arg Thr Pro Arg Asp His Ala Leu Thr
            260                 265                 270

Ala Leu Val Thr Phe Gly Glu Gly Tyr His Asn Phe His His Glu Phe
        275                 280                 285

Pro Ser Asp Tyr Arg Asn Ala Leu Ile Trp Tyr Gln Tyr Asp Pro Thr
    290                 295                 300

Lys Trp Leu Ile Trp Thr Leu Lys Gln Val Gly Leu Ala Trp Asp Leu
305                 310                 315                 320

Gln Thr Phe Ser Gln Asn Ala Ile Glu Gln Gly Leu Val Gln Gln Arg
                325                 330                 335

Gln Lys Lys Leu Asp Lys Trp Arg Asn Asn Leu Asn Trp Gly Ile Pro
            340                 345                 350

Ile Glu Gln Leu Pro Val Ile Glu Phe Glu Phe Gln Glu Gln Ala
        355                 360                 365
```

```
Lys Thr Arg Asp Leu Val Leu Ile Ser Gly Ile Val His Asp Val Ser
        370                 375                 380

Ala Phe Val Glu His His Pro Gly Gly Lys Ala Leu Ile Met Ser Ala
385                 390                 395                 400

Val Gly Lys Asp Gly Thr Ala Val Phe Asn Gly Gly Val Tyr Arg His
                405                 410                 415

Ser Asn Ala Gly His Asn Leu Leu Ala Thr Met Arg Val Ser Val Ile
                420                 425                 430

Arg Gly Gly Met Glu Val Glu Val Trp Lys Thr Ala Gln Asn Glu Lys
                435                 440                 445

Lys Asp Gln Asn Ile Val Ser Asp Glu Ser Gly Asn Arg Ile His Arg
450                 455                 460

Ala Gly Leu Gln Ala Thr Arg Val Glu Asn Pro Gly Met Ser Gly Met
465                 470                 475                 480

Ala Ala

<210> SEQ ID NO 7
<211> LENGTH: 1101
<212> TYPE: DNA
<213> ORGANISM: Yarrowia lipolytica
<220> FEATURE:
<221> NAME/KEY: CDS
<222> LOCATION: (1)..(1101)
<223> OTHER INFORMATION: choline-phosphate cytidylyl-transferase;
      GenBank Accession No. XM_502978

<400> SEQUENCE: 7 atg gcc aaa agc aaa cga cgg tcg gag gct gtg gaa gag cac gtg acc       48
Met Ala Lys Ser Lys Arg Arg Ser Glu Ala Val Glu Glu His Val Thr
1               5                   10                  15 ggc tcg gac gag ggc ttg acc gat act tcg ggt cac gtg agc cct gcc       96
Gly Ser Asp Glu Gly Leu Thr Asp Thr Ser Gly His Val Ser Pro Ala
            20                  25                  30 gcc aag aag cag aag aac tcg gag att cat ttc acc acc cag gct gcc      144
Ala Lys Lys Gln Lys Asn Ser Glu Ile His Phe Thr Thr Gln Ala Ala
        35                  40                  45 cag cag ttg gat cgg gag cgc aag gag gag tat ctg gac tcg ctg atc      192
Gln Gln Leu Asp Arg Glu Arg Lys Glu Glu Tyr Leu Asp Ser Leu Ile
    50                  55                  60 gac aac aag gac tat ctc aag tac cgt cct cga ggc tgg aag ctc aac      240
Asp Asn Lys Asp Tyr Leu Lys Tyr Arg Pro Arg Gly Trp Lys Leu Asn
65                  70                  75                  80 aac ccg cct acc gac cga cct gtg cga atc tac gcc gat gga gtg ttt      288
Asn Pro Pro Thr Asp Arg Pro Val Arg Ile Tyr Ala Asp Gly Val Phe
                85                  90                  95 gat ttg ttc cat ctg gga cac atg cgt cag ctg gag cag tcc aag aag      336
Asp Leu Phe His Leu Gly His Met Arg Gln Leu Glu Gln Ser Lys Lys
            100                 105                 110 gcc ttc ccc aac gca gtg ttg att gtg ggc att ccc agc gac aag gag      384
Ala Phe Pro Asn Ala Val Leu Ile Val Gly Ile Pro Ser Asp Lys Glu
        115                 120                 125 acc cac aag cgg aag gga ttg acc gtg ctg agt gac gtc cag cgg tac      432
Thr His Lys Arg Lys Gly Leu Thr Val Leu Ser Asp Val Gln Arg Tyr
    130                 135                 140 gag acg gtg cga cac tgc aag tgg gtg gac gag gtg gtg gag gat gct      480
Glu Thr Val Arg His Cys Lys Trp Val Asp Glu Val Val Glu Asp Ala
145                 150                 155                 160 ccc tgg tgt gtc acc atg gac ttt ctg gaa aaa cac aaa atc gac tac      528
Pro Trp Cys Val Thr Met Asp Phe Leu Glu Lys His Lys Ile Asp Tyr
                165                 170                 175
```

```
gtg gcc cat gac gat ctg ccc tac gct tcc ggc aac gac gat gat atc      576
Val Ala His Asp Asp Leu Pro Tyr Ala Ser Gly Asn Asp Asp Asp Ile
            180                 185                 190 tac aag ccc atc aag gag aag ggc atg ttt ctg gcc acc cag cga acc      624
Tyr Lys Pro Ile Lys Glu Lys Gly Met Phe Leu Ala Thr Gln Arg Thr
195                 200                 205 gag ggc att tcc acc tcg gac atc atc acc aag att atc cga gac tac      672
Glu Gly Ile Ser Thr Ser Asp Ile Ile Thr Lys Ile Ile Arg Asp Tyr
        210                 215                 220 gac aag tat tta atg cga aac ttt gcc cgg ggt gct aac cga aag gat      720
Asp Lys Tyr Leu Met Arg Asn Phe Ala Arg Gly Ala Asn Arg Lys Asp
225                 230                 235                 240 ctc aac gtc tcg tgg ctc aag aag aac gag ctg gac ttc aag cgt cat      768
Leu Asn Val Ser Trp Leu Lys Lys Asn Glu Leu Asp Phe Lys Arg His
            245                 250                 255 gtg gcc gag ttc cga aac tcg ttc aag cga aag aag gtc ggt aag gat      816
Val Ala Glu Phe Arg Asn Ser Phe Lys Arg Lys Lys Val Gly Lys Asp
                260                 265                 270 ctc tac ggc gag att cgc ggt ctg ctg cag aat gtg ctc att tgg aac      864
Leu Tyr Gly Glu Ile Arg Gly Leu Leu Gln Asn Val Leu Ile Trp Asn
        275                 280                 285 ggc gac aac tcc ggc act tcc act ccc cag cga aag acg ctg cag acc      912
Gly Asp Asn Ser Gly Thr Ser Thr Pro Gln Arg Lys Thr Leu Gln Thr
290                 295                 300 aac gcc aag aag atg tac atg aac gtg ctc aag act ctg cag gct cct      960
Asn Ala Lys Lys Met Tyr Met Asn Val Leu Lys Thr Leu Gln Ala Pro
305                 310                 315                 320 gac gct gtt gac gtg gac tcc tcg gag aac gtg tct gag aac gtc act     1008
Asp Ala Val Asp Val Asp Ser Ser Glu Asn Val Ser Glu Asn Val Thr
                325                 330                 335 gat gag gag gag gaa gac gac gag gtt gat gag gac gaa gaa gcc         1056
Asp Glu Glu Glu Glu Asp Asp Glu Val Asp Glu Asp Glu Glu Ala
        340                 345                 350 gac gac gac gac gaa gac gac gaa gac gag gaa gac gac gag tag         1101
Asp Asp Asp Asp Glu Asp Asp Glu Asp Glu Glu Asp Asp Glu
        355                 360                 365

<210> SEQ ID NO 8
<211> LENGTH: 366
<212> TYPE: PRT
<213> ORGANISM: Yarrowia lipolytica

<400> SEQUENCE: 8

Met Ala Lys Ser Lys Arg Arg Ser Glu Ala Val Glu Glu His Val Thr
1               5                   10                  15

Gly Ser Asp Glu Gly Leu Thr Asp Thr Ser Gly His Val Ser Pro Ala
            20                  25                  30

Ala Lys Lys Gln Lys Asn Ser Glu Ile His Phe Thr Thr Gln Ala Ala
        35                  40                  45

Gln Gln Leu Asp Arg Glu Arg Lys Glu Tyr Leu Asp Ser Leu Ile
    50                  55                  60

Asp Asn Lys Asp Tyr Leu Lys Tyr Arg Pro Arg Gly Trp Lys Leu Asn
65                  70                  75                  80

Asn Pro Pro Thr Asp Arg Pro Val Arg Ile Tyr Ala Asp Gly Val Phe
                85                  90                  95

Asp Leu Phe His Leu Gly His Met Arg Gln Leu Glu Gln Ser Lys Lys
            100                 105                 110

Ala Phe Pro Asn Ala Val Leu Ile Val Gly Ile Pro Ser Asp Lys Glu
```

```
                    115                 120                 125
Thr His Lys Arg Lys Gly Leu Thr Val Leu Ser Asp Val Gln Arg Tyr
    130                 135                 140

Glu Thr Val Arg His Cys Lys Trp Val Asp Glu Val Val Glu Asp Ala
145                 150                 155                 160

Pro Trp Cys Val Thr Met Asp Phe Leu Glu Lys His Lys Ile Asp Tyr
                165                 170                 175

Val Ala His Asp Asp Leu Pro Tyr Ala Ser Gly Asn Asp Asp Asp Ile
            180                 185                 190

Tyr Lys Pro Ile Lys Glu Lys Gly Met Phe Leu Ala Thr Gln Arg Thr
        195                 200                 205

Glu Gly Ile Ser Thr Ser Asp Ile Ile Thr Lys Ile Ile Arg Asp Tyr
    210                 215                 220

Asp Lys Tyr Leu Met Arg Asn Phe Ala Arg Gly Ala Asn Arg Lys Asp
225                 230                 235                 240

Leu Asn Val Ser Trp Leu Lys Lys Asn Glu Leu Asp Phe Lys Arg His
                245                 250                 255

Val Ala Glu Phe Arg Asn Ser Phe Lys Arg Lys Lys Val Gly Lys Asp
            260                 265                 270

Leu Tyr Gly Glu Ile Arg Gly Leu Leu Gln Asn Val Leu Ile Trp Asn
        275                 280                 285

Gly Asp Asn Ser Gly Thr Ser Thr Pro Gln Arg Lys Thr Leu Gln Thr
    290                 295                 300

Asn Ala Lys Lys Met Tyr Met Asn Val Leu Lys Thr Leu Gln Ala Pro
305                 310                 315                 320

Asp Ala Val Asp Val Asp Ser Ser Glu Asn Val Ser Glu Asn Val Thr
                325                 330                 335

Asp Glu Glu Glu Glu Asp Asp Glu Val Asp Glu Asp Glu Glu Ala
            340                 345                 350

Asp Asp Asp Asp Glu Asp Asp Glu Asp Glu Glu Asp Asp Glu
        355                 360                 365
```

PURIFICATION OF TRIGLYCERIDE OIL FROM MICROBIAL SOURCES USING SHORT PATH DISTILLATION

This application claims the benefit of U.S. Provisional Application No. 61/441,842, filed Feb. 11, 2011, which is hereby incorporated by reference in its entirety.

FIELD OF THE INVENTION

The present invention is directed to the purification of lipids containing polyunsaturated fatty acids (PUFAs). In particular, processes are provided for reducing the amount of undesired sterols (e.g., ergosterol) from microbial oil compositions enriched in triacylglyercols and comprising at least one PUFA using short path distillation (SPD).

BACKGROUND OF THE INVENTION

Microorganisms such as filamentous fungi, yeast and algae produce a variety of lipids, including fatty acyls, glycerolipids, phospholipids, sphingolipids, saccharolipids, polyketides, sterol lipids and prenol lipids. It is advantageous to extract some of these lipids from the microbial cells in which they are produced, and thus a variety of processes have been implemented.

One class of lipids commonly extracted from microbes is glycerolipids, including the fatty acid esters of glycerol ("triacylglycerols" or "TAGs"). TAGs are the primary storage unit for fatty acids, and thus may contain long chain polyunsaturated fatty acids (PUFAs), as well as shorter saturated and unsaturated fatty acids and longer chain saturated fatty acids. There has been growing interest in including PUFAs, such as eicosapentaenoic acid ["EPA"; omega-3] and docosahexaenoic acid ["DHA"; omega-3], in pharmaceutical and dietary products. Means to efficiently and cost-effectively extract, refine and purify lipid compositions comprising PUFAs are therefore particularly desirable.

Many typical lipid isolation procedures involve disruption of the microbial cells (e.g., via mechanical, enzymatic or chemical means), followed by oil extraction using organic or green solvents. The disruption process releases the intracellular lipids from the microbial cells, which makes them readily accessible to the solvent during extraction. After extraction, the solvent is typically removed (e.g., by evaporation, for example by application of vacuum, change of temperature or pressure, etc.).

The resulting extracted oil is enriched in lipophilic components that accumulate in lipid bodies. In general, the major components of lipid bodies consist of TAGs, ergosterol esters, other sterol esters, free ergosterol and phospholipids. PUFAs present in lipid bodies are mainly as components of TAGs, diacylglycerols, monoacylglycerols and phospholipids, but can also be in the form of free fatty acids. The extracted oil may be subsequently refined to produce a highly purified TAG fraction enriched in PUFAs. Final specifications concerning the purified TAG fraction may be application-dependent, for example, depending on whether the oil is to be used as an additive or supplement (e.g., in food compositions, infant formulas, animal feeds, etc.), in cosmetic or pharmaceutical compositions, etc. Acceptable contaminant standards are either self-imposed (wherein a particular contaminant results in an undesirable property, e.g., haziness/cloudiness, odor) or determined by external nutrition councils (e.g., A Voluntary Monograph Of The Council for Responsible Nutrition (Washington, D.C.), March 2006, specifies the maximum acid, peroxide, anisidine, TOTOX, polychlorinated dibenzo-para-dioxin and polychlorinated dibenzofuran values for omega-3 EPA, omega-3 DHA and mixtures thereof).

U.S. Pat. No. 6,166,230 (GIST-Brocades) describes a process for treating a microbial oil comprising PUFAs (e.g., from *Mortierella alpina*) with a polar solvent to extract at least one sterol (e.g., desmosterol) that is soluble in the solvent and then separating at least some of the solvent containing the sterol from the oil, wherein the oil has a sterol content of less than 1.5%.

U.S. Pat. No. 7,695,626 (Martek) describes a process for recovering neutral lipids comprising PUFAs from a microbial biomass (e.g., *Schizochytrium*), said process comprising the steps of contacting the biomass with a nonpolar solvent to recover lipid in an extraction process, refining and/or bleaching and/or deodorizing the lipid composition, adding a polar solvent to the lipid composition, cooling the mixture to selectively precipitate at least one other compound (e.g., trisaturated glycerides, phosphorus-containing materials, wax esters, saturated fatty acid containing sterol esters, sterols, squalene, hydrocarbons) and then reducing the amount of this undesirable compound from the lipid composition.

Previous methods have not utilized techniques of short path distillation as an effective means to avoid exposing PUFAs, specifically highly unsaturated fatty acids, to high temperatures and reduce the amount of ergosterol (ergosta-5,7,22-trien-3β-ol; CAS Registry Number 57-87-4) contaminants from microbial oils.

SUMMARY OF THE INVENTION

In a first embodiment, the invention concerns a process for reducing the amount of sterol in a sterol-containing microbial oil composition, said method comprising:
   a) distilling, at least once under short path distillation conditions, the sterol-containing microbial oil wherein said oil comprises:
      (i) triacylglycerol comprising one or more polyunsaturated fatty acids; and,
      (ii) a sterol fraction of at least 300 mg/100 g of oil;
      wherein said distillation produces a distillate fraction comprising the sterol and a triacylglycerol-containing fraction having a reduced amount of the sterol when compared to the amount of sterol in the sterol-containing microbial oil composition that has not been subjected to short path distillation; and,
   b) optionally, recovering the triacylglycerol-containing fraction.

In a second embodiment, the short path distillation conditions comprise at least one pass of the sterol-containing microbial oil at a vacuum level of not more than 30 mTorr and a temperature of not more than 300° C.

In a third embodiment, the sterol fraction comprises one or more sterols selected from the group consisting of: stigmasterol, ergosterol, brassicasterol, campesterol, β-sitosterol and desmosterol.

In a fourth embodiment, the reduction in the amount of sterols in the triacylglycerol-containing fraction is at least 40% when compared to the amount of sterols in the sterol-containing microbial oil composition. Preferably, the reduction in the amount of sterols in the triacylglycerol-containing fraction is at least 70% and more preferably at least 80% when compared to the amount of sterols in the sterol-containing microbial oil composition.

In a fifth embodiment, the triacylglycerol-containing fraction having a reduced sterol fraction has improved clarity when compared to the sterol-containing microbial oil composition that has not been subjected to short path distillation.

In a sixth embodiment, the sterol-containing microbial oil composition is obtained from yeast, algae, euglenoids, stramenopiles, fungi, or a mixture thereof. Preferably, the sterol-containing microbial oil composition is obtained from oleaginous microbes from a genus selected from the group consisting of *Mortierella, Thraustochytrium, Schizochytrium, Yarrowia, Candida, Rhodotorula, Rhodosporidium, Cryptococcus, Trichosporon,* and *Lipomyces*; more preferably, the sterol-containing microbial oil composition is obtained from microbial biomass of recombinant *Yarrowia* cells engineered for the production of a polyunsaturated fatty acid(s).

In a seventh embodiment, the distilling step may include two or more consecutive short path distillations of the microbial oil composition. Each consecutive short path distillation may be at a temperature that is higher than the temperature of the immediately preceding short path distillation.

Biological Deposits

The following biological materials have been deposited with the American Type Culture Collection (ATCC), 10801 University Boulevard, Manassas, Va. 20110-2209, and bear the following designations, accession numbers and dates of deposit.

| Biological Material | Accession No. | Date of Deposit |
|---|---|---|
| *Yarrowia lipolytica* Y8412 | ATCC PTA-10026 | May 14, 2009 |
| *Yarrowia lipolytica* Y8259 | ATCC PTA-10027 | May 14, 2009 |

The biological materials listed above were deposited under the terms of the Budapest Treaty on the International Recognition of the Deposit of Microorganisms for the Purposes of Patent Procedure. The listed deposit will be maintained in the indicated international depository for at least 30 years and will be made available to the public upon the grant of a patent disclosing it. The availability of a deposit does not constitute a license to practice the subject invention in derogation of patent rights granted by government action.

*Yarrowia lipolytica* Y9502 was derived from *Y. lipolytica* Y8412, according to the methodology described in U.S. Pat. Appl. Pub. No. 2010-0317072-A1. Similarly, *Yarrowia lipolytica* Y8672 was derived from *Y. lipolytica* Y8259, according to the methodology described in U.S. Pat. Appl. Pub. No. 2010-0317072-A1.

BRIEF DESCRIPTION OF THE DRAWINGS AND SEQUENCE LISTING

FIG. 1 provides an overview of the processes of the invention, in the form of a flowchart. Specifically, a microbial fermentation produces untreated microbial biomass, which may optionally be mechanically processed. Oil extraction of the untreated microbial biomass results in residual biomass and extracted oil. Distillation of the extracted oil using short path distillation (SPD) conditions then reduces the amount of sterols in the purified triacylglyceride (TAG)-fraction (i.e., the SPD-purified microbial oil).

FIG. 2 provides plasmid maps for the following: (A) pZKUM; and, (B) pZKL3-9DP9N.

The following sequences comply with 37 C.F.R. §1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (1998) and the sequence listing requirements of the EPO and PCT (Rules 5.2 and 49.5 (a-bis), and Section 208 and Annex C of the Administrative Instructions). The symbols and format used for nucleotide and amino acid sequence data comply with the rules set forth in 37 C.F.R. §1.822.

SEQ ID NOs:1-8 are open reading frames encoding genes, proteins (or portions thereof), or plasmids, as identified in Table 1.

TABLE 1

Summary Of Nucleic Acid And Protein SEQ ID Numbers

| Description | Nucleic acid SEQ ID NO. | Protein SEQ ID NO. |
|---|---|---|
| Plasmid pZKUM | 1 (4313 bp) | — |
| Plasmid pZKL3-9DP9N | 2 (13565 bp) | — |
| Synthetic mutant delta-9 elongase, derived from *Euglena gracilis* ("EgD9eS-L35G") | 3 (777 bp) | 4 (258 AA) |
| *Yarrowia lipolytica* delta-9 desaturase gene (GenBank Accession No. XM_501496) | 5 (1449 bp) | 6 (482 AA) |
| *Yarrowia lipolytica* choline-phosphate cytidylyl-transferase gene (GenBank Accession No. XM_502978) | 7 (1101 bp) | 8 (366 AA) |

DETAILED DESCRIPTION OF THE INVENTION

The disclosures of all patent and non-patent literature cited herein are hereby incorporated by reference in their entireties.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprises", "comprising", "includes", "including", "has", "having", "contains" or "containing", or any other variation thereof, are intended to cover a non-exclusive inclusion. For example, a composition, mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein the term "invention" or "present invention" is intended to refer to all aspects and embodiments of the invention as described in the claims and specification herein and should not be read so as to be limited to any particular embodiment or aspect.

The following definitions are used in this disclosure:

"Carbon dioxide" is abbreviated as "$CO_2$".

"American Type Culture Collection" is abbreviated as "ATCC".

"Polyunsaturated fatty acid(s)" is abbreviated as "PUFA(s)".

"Phospholipids" are abbreviated as "PLs".

"Triacylglycerols" are abbreviated as "TAGs". Herein the term "triacylglycerols" (TAGs) is synonymous with the term "triacylglycerides" and refers to neutral lipids composed of three fatty acyl residues esterified to a glycerol molecule. TAGs can contain long chain PUFAs and saturated fatty acids, as well as shorter chain saturated and unsaturated fatty acids.

"Free fatty acids" are abbreviated as "FFAs".

"Total fatty acids" are abbreviated as "TFAs".

"Fatty acid methyl esters" are abbreviated as "FAMEs".

"Dry cell weight" is abbreviated as "DCW".

"Millitorr" is abbreviated as "mTorr".

The term "reduced" means having a smaller quantity, for example a quantity only slightly less than the original quantity, or for example a quantity completely lacking in the specified material, and including all quantities in between.

As used herein the term "microbial biomass" refers to microbial cellular material from a microbial fermentation comprising TAGs comprising PUFAs. The biomass may be in the form of whole cells, whole cell lysates, homogenized cells, partially hydrolyzed cellular material, and/or disrupted cells.

The term "untreated microbial biomass" refers to microbial biomass prior to extraction with a solvent. Optionally, untreated microbial biomass may be subjected to at least one mechanical process (e.g., by drying the biomass, disrupting the biomass, or a combination of these) prior to extraction with a solvent.

As used herein the term "residual biomass" refers to microbial cellular material from a microbial fermentation comprising TAGs that comprise PUFAs, which has been extracted at least once with a solvent.

The term "lipids" refer to any fat-soluble (i.e., lipophilic), naturally-occurring molecule. Lipids are a diverse group of compounds that have many key biological functions, such as structural components of cell membranes, energy storage sources and intermediates in signaling pathways. Lipids may be broadly defined as hydrophobic or amphiphilic small molecules that originate entirely or in part from either ketoacyl or isoprene groups. A general overview of lipids, based on the Lipid Metabolites and Pathways Strategy (LIPID MAPS) classification system (National Institute of General Medical Sciences, Bethesda, Md.), is shown below in Table 2.

TABLE 2

Overview Of Lipid Classes

| Structural Building Block | Lipid Category | Examples Of Lipid Classes |
|---|---|---|
| Derived from condensation of ketoacyl subunits | Fatty Acyls | Includes fatty acids, eicosanoids, fatty esters and fatty amides |
| | Glycerolipids | Includes mainly mono-, di- and tri-substituted glycerols, the most well-known being the fatty acid esters of glycerol (triacylglycerols) |
| | Glycero-phospholipids or Phospholipids | Includes phosphatidylcholine, phosphatidylethanolamine, phosphatidylserine, phosphatidylinositols and phosphatidic acids |
| | Sphingolipids | Includes ceramides, phospho-sphingolipids (e.g., sphingomyelins), glycosphingolipids (e.g., gangliosides), sphingosine, cerebrosides |
| | Saccharolipids | Includes acylaminosugars, acylamino-sugar glycans, acyltrehaloses, acyltrehalose glycans |
| | Polyketides | Includes halogenated acetogenins, polyenes, linear tetracyclines, polyether antibiotics, flavonoids, aromatic polyketides |
| Derived from condensation of isoprene subunits | Sterol Lipids | Includes sterols (e.g., cholesterol), C18 steroids (e.g., estrogens), C19 steroids (e.g., androgens), C21 steroids (e.g., progestogens, glucocorticoids and mineral-ocorticoids), secosteroids, bile acids |
| | Prenol Lipids | Includes isoprenoids, carotenoids, quinones, hydroquinones, polyprenols, hopanoids |

The term "sterol-containing microbial oil composition" refers to a lipid substance that is liquid at 25° C. and comprises (i) at least one sterol; and (ii) triacylglycerides (TAGs) comprising one or more PUFAs. More specifically, the sterol-containing microbial oil composition derived from a microbial biomass has a sterol fraction of at least 300 mg/100 g of oil, comprising one or more sterols.

Sterols, which function in the membrane permeability of cells, have been isolated from all major groups of living organisms, although there is diversity in the predominant sterol isolated. The predominant sterol in higher animals is cholesterol, while R-sitosterol is commonly the predominant sterol in higher plants (although it is frequently accompanied by campesterol and stigmasterol). Generalization concerning the predominant sterol(s) found in microbes is more difficult, as the composition depends on the particular microbial species. For example, the oleaginous yeast *Yarrowia lipolytica* predominantly comprises ergosterol, fungi of the genus *Mortierella* predominantly comprise cholesterol and desmosterol, and stramenopiles of the genus *Schizochytrium* predominantly comprise brassicasterol and stigmasterol. A summary of sterols often found in sterol-containing microbial oils is shown below in Table 3; in contrast, these sterols are not typically found in fish oils. When present in sterol-containing microbial oils, the sterols of Table 3 tend to precipitate out of the microbial oil due to high melting points and reduced solubility at lower storage temperatures, which result in a cloudy oil. It is highly desirable to minimize undesirable cloudiness in the microbial oil by reducing the concentration of these sterols.

TABLE 3

Sterols In Sterol-Containing Microbial Oils

| Common Name | Chemical Name | CAS Registry No. |
|---|---|---|
| Stigmasterol | Stigmasta-5,22-dien-3-ol | 83-48-7 |
| Ergosterol | Ergosta-5,7,22-trien-3β-ol | 474-67-9 |
| Brassicasterol | Ergosta-5,22-dien-3β-ol | 57-87-4 |
| Campesterol | (24R)-Ergost-5-en-3β-ol | 474-62-4 |

TABLE 3-continued

Sterols In Sterol-Containing Microbial Oils

| Common Name | Chemical Name | CAS Registry No. |
| --- | --- | --- |
| β-Sitosterol | Stigmast-5-en-3-ol, | 83-46-5 |
| Desmosterol | Cholesta-5,24-dien-3β-ol | 313-04-2 |

Preferred sterol-containing microbial oils have a sterol fraction of at least 300 mg/100 g of oil, comprising one or more sterols.

The sterol-containing microbial oil composition also preferably comprises about 25% PUFAs in the total lipids, preferably at least about 30% PUFAs in the total lipids, more preferably at least about 35% PUFAs in the total lipids, more preferably at least about 40% PUFAs in the total lipids, more preferably at least about 40-45% PUFAs in the total lipids, more preferably at least about 45-50% PUFAs in the total lipids, more preferably at least about 50-60% PUFAs, and most preferably at least about 60-70% PUFAs or greater in the total lipids.

The sterol-containing microbial oil composition is derived from a microbial biomass typically provided by microbial fermentation. Thus, the sterol-containing microbial oil composition useful in the invention may include water. Preferably the oil has a moisture content of less than 10 weight percent, more preferably a moisture content of less than 5 weight percent, and most preferably a moisture content of 3 weight percent or less.

In oleaginous organisms, oil constitutes a major part of the total lipid. "Oil" is composed primarily of triacylglycerols (TAGs) but may also contain other neutral lipids, phospholipids (PLs) and free fatty acids (FFAs). The fatty acid composition in the oil and the fatty acid composition of the total lipid are generally similar; thus, an increase or decrease in the concentration of PUFAs in the total lipid will correspond with an increase or decrease in the concentration of PUFAs in the oil, and vice versa.

"Neutral lipids" refer to those lipids commonly found in cells in lipid bodies as storage fats and are so called because at cellular pH, the lipids bear no charged groups. Generally, they are completely non-polar with no affinity for water. Neutral lipids generally refer to mono-, di-, and/or triesters of glycerol with fatty acids, also called monoacylglycerol, diacylglycerol or triacylglycerol (TAG), respectively, or collectively, acylglycerols. A hydrolysis reaction must occur to release FFAs from acylglycerols.

The term "extracted oil" refers to an oil that has been separated from cellular materials, such as the microorganism in which the oil was synthesized. Extracted oils are obtained through a wide variety of methods, the simplest of which involves physical means alone. For example, mechanical crushing using various press configurations (e.g., screw, expeller, piston, bead beaters, etc.) can separate oil from cellular materials. Alternatively, oil extraction can occur via treatment with various organic solvents (e.g., hexane, isohexane), enzymatic extraction, osmotic shock, ultrasonic extraction, supercritical fluid extraction (e.g., $CO_2$ extraction), saponification and combinations of these methods. Further purification or concentration of an extracted oil is optional.

The term "refined lipid composition" refers to a microbial oil composition that is the product of a supercritical carbon dioxide ($CO_2$) extraction as disclosed in U.S. Pat. Pub. No. 2011-0263709-A1. The refined lipid composition may comprise neutral lipids and/or free fatty acids while being substantially free of phospholipids. The refined lipid composition preferably has less than 30 ppm phosphorous, and more preferably less than 20 ppm phosphorous, as determined by the American Oil Chemists' Society (AOCS) Official Method Ca 20-99 entitled "Analysis for Phosphorus in Oil by Inductively Coupled Plasma Optical Emission Spectroscopy" (*Official Methods and Recommended Practices of the AOCS, 6th ed.*, Urbana, Ill., AOCS Press, 2009, incorporated herein by reference). The refined lipid composition may be enriched in TAGs relative to the oil composition of the microbial biomass. The refined lipid composition may undergo further purification, such as via short path distillation as described herein, to produce a "purified oil".

Thus, a preferred sterol-containing microbial oil composition for the process described herein is a refined lipid composition derived from supercritical $CO_2$ extraction, the refined lipid composition comprising TAGs comprising at least one PUFA and comprising at least one sterol.

The term "distilling" refers to a method of separating mixtures based on differences in their volatilities in a boiling liquid mixture. Distillation is a unit operation, or a physical separation process, and not a chemical reaction.

The term "short path distillation" (abbreviated as "SPD") refers to a separation method operating under an extremely high vacuum, in which the SPD device is equipped with an internal condenser in close proximity to the evaporator, such that volatile compounds from the material to be distilled after evaporation travel only a short distance to the condensing surface. As a result, there is minimal thermal degradation from this separation method.

The term "SPD-purified oil" refers to a microbial oil containing a triacylglycerol-fraction comprising one or more PUFAs, said oil having undergone a process of distillation at least once under short path distillation conditions. The distillation process reduces the amount of sterol in the SPD purified oil, as compared to the sterol content in the oil prior to short path distillation.

The term "total fatty acids" (TFAs) herein refer to the sum of all cellular fatty acids that can be derivatized to fatty acid methyl esters (FAMEs) by the base transesterification method (as known in the art) in a given sample, which may be the biomass or oil, for example. Thus, total fatty acids include fatty acids from neutral lipid fractions (including diacylglycerols, monoacylglycerols and TAGs) and from polar lipid fractions (including the phosphatidylcholine and the phosphatidylethanolamine fractions) but not FFAs.

The term "total lipid content" of cells is a measure of TFAs as a percent of the dry cell weight (DCW), although total lipid content can be approximated as a measure of FAMEs as a percent of the DCW (FAMEs % DCW). Thus, total lipid content (TFAs % DCW) is equivalent to, e.g., milligrams of total fatty acids per 100 milligrams of DCW.

The concentration of a fatty acid in the total lipid is expressed herein as a weight percent of TFAs (% TFAs), e.g., milligrams of the given fatty acid per 100 milligrams of TFAs. Unless otherwise specifically stated in the disclosure herein, reference to the percent of a given fatty acid with respect to total lipids is equivalent to concentration of the fatty acid as % TFAs (e.g., % EPA of total lipids is equivalent to EPA % TFAs).

In some cases, it is useful to express the content of a given fatty acid(s) in a cell as its weight percent of the dry cell weight (% DCW). Thus, for example, eicosapentaenoic acid % DCW would be determined according to the following formula: (eicosapentaenoic acid % TFAs)*(TFAs % DCW)]/100. The content of a given fatty acid(s) in a cell as its weight percent of the dry cell weight (% DCW) can be approximated, however, as: (eicosapentaenoic acid % TFAs)*(FAMEs % DCW)]/100.

The terms "lipid profile" and "lipid composition" are interchangeable and refer to the amount of individual fatty acids contained in a particular lipid fraction, such as in the total lipid or the oil, wherein the amount is expressed as a weight percent of TFAs. The sum of the individual fatty acids present in the mixture should be 100.

The term "fatty acids" refers to long chain aliphatic acids (alkanoic acids) of varying chain lengths, from about $C_{12}$ to $C_{22}$, although both longer and shorter chain-length acids are known. The predominant chain lengths are between $C_{16}$ and $C_{22}$. The structure of a fatty acid is represented by a simple notation system of "X:Y", where X is the total number of carbon ["C"] atoms in the particular fatty acid and Y is the number of double bonds. Additional details concerning the differentiation between "saturated fatty acids" versus "unsaturated fatty acids", "monounsaturated fatty acids" versus "polyunsaturated fatty acids" (PUFAs), and "omega-6 fatty acids" ("ω-6" or "n-6") versus "omega-3 fatty acids" ("ω-3" or "n-3") are provided in U.S. Pat. No. 7,238,482, which is hereby incorporated herein by reference.

Nomenclature used to describe PUFAs herein is given in Table 4. In the column titled "Shorthand Notation", the omega-reference system is used to indicate the number of carbons, the number of double bonds and the position of the double bond closest to the omega carbon, counting from the omega carbon, which is numbered 1 for this purpose. The remainder of the Table summarizes the common names of omega-3 and omega-6 fatty acids and their precursors, the abbreviations that will be used throughout the specification and the chemical name of each compound.

TABLE 4

Nomenclature of Polyunsaturated Fatty Acids And Precursors

| Common Name | Abbreviation | Chemical Name | Shorthand Notation |
|---|---|---|---|
| Myristic | — | tetradecanoic | 14:0 |
| Palmitic | Palmitate | hexadecanoic | 16:0 |
| Palmitoleic | — | 9-hexadecenoic | 16:1 |
| Stearic | — | octadecanoic | 18:0 |
| Oleic | — | cis-9-octadecenoic | 18:1 |
| Linoleic | LA | cis-9,12-octadecadienoic | 18:2 omega-6 |
| Gamma-Linolenic | GLA | cis-6,9,12-octadecatrienoic | 18:3 omega-6 |
| Eicosadienoic | EDA | cis-11,14-eicosadienoic | 20:2 omega-6 |
| Dihomo-Gamma-Linolenic | DGLA | cis-8,11,14-eicosatrienoic | 20:3 omega-6 |
| Arachidonic | ARA | cis-5,8,11,14-eicosatetraenoic | 20:4 omega-6 |
| Alpha-Linolenic | ALA | cis-9,12,15-octadecatrienoic | 18:3 omega-3 |
| Stearidonic | STA | cis-6,9,12,15-octadecatetraenoic | 18:4 omega-3 |
| Eicosatrienoic | ETrA | cis-11,14,17-eicosatrienoic | 20:3 omega-3 |
| Eicosatetraenoic | ETA | cis-8,11,14,17-eicosatetraenoic | 20:4 omega-3 |
| Eicosapentaenoic | EPA | cis-5,8,11,14,17-eicosapentaenoic | 20:5 omega-3 |
| Docosatetraenoic | DTA | cis-7,10,13,16-docosatetraenoic | 22:4 omega-3 |

TABLE 4-continued

Nomenclature of Polyunsaturated Fatty Acids And Precursors

| Common Name | Abbreviation | Chemical Name | Shorthand Notation |
|---|---|---|---|
| Docosapentaenoic | DPAn-6 | cis-4,7,10,13,16-docosapentaenoic | 22:5 omega-6 |
| Docosapentaenoic | DPAn-3 | cis-7,10,13,16,19-docosapentaenoic | 22:5 omega-3 |
| Docosahexaenoic | DHA | cis-4,7,10,13,16,19-docosahexaenoic | 22:6 omega-3 |

The term "high-level PUFA production" refers to production of at least about 25% PUFAs in the total lipids of the microbial host, preferably at least about 30% PUFAs in the total lipids, more preferably at least about 35% PUFAs in the total lipids, more preferably at least about 40% PUFAs in the total lipids, more preferably at least about 40-45% PUFAs in the total lipids, more preferably at least about 45-50% PUFAs in the total lipids, more preferably at least about 50-60% PUFAs, and most preferably at least about 60-70% PUFAs in the total lipids. The structural form of the PUFA is not limiting; thus, for example, the PUFAs may exist in the total lipids as FFAs or in esterified forms such as acylglycerols, phospholipids, sulfolipids or glycolipids.

The term "oleaginous" refers to those organisms that tend to store their energy source in the form of oil (Weete, In: Fungal Lipid Biochemistry, $2^{nd}$ Ed., Plenum, 1980). Generally, the cellular oil of oleaginous microorganisms follows a sigmoid curve, wherein the concentration of lipid increases until it reaches a maximum at the late logarithmic or early stationary growth phase and then gradually decreases during the late stationary and death phases (Yongmanitchai and Ward, *Appl. Environ. Microbiol.*, 57:419-25 (1991)). It is not uncommon for oleaginous microorganisms to accumulate in excess of about 25% of their dry cell weight as oil.

The sterol-containing microbial oil composition may be derived from microbial host cells selected from the group consisting of yeast, algae, euglenoids, stramenopiles, fungi, and mixtures thereof. Preferably, the microbial host cells are oleaginous and can be a member of a genus selected from the group consisting of *Mortierella, Thraustochytrium, Schizochytrium, Yarrowia, Candida, Rhodotorula, Rhodosporidium, Cryptococcus, Trichosporon*, and *Lipomyces*. The term "oleaginous yeast" refers to those microorganisms classified as yeasts that can make oil. Examples of oleaginous yeast include, but are by no means limited to, the following genera: *Yarrowia, Candida, Rhodotorula, Rhodosporidium, Cryptococcus, Trichosporon* and *Lipomyces*.

In general, lipid accumulation in oleaginous microorganisms is triggered in response to the overall carbon to nitrogen ratio present in the growth medium. This process, leading to the de novo synthesis of free palmitate (16:0) in oleaginous microorganisms, is described in detail in U.S. Pat. No. 7,238,482. Palmitate is the precursor of longer-chain saturated and unsaturated fatty acid derivates, which are formed through the action of elongases and desaturases.

A wide spectrum of fatty acids (including saturated and unsaturated fatty acids and short-chain and long-chain fatty acids) can be incorporated into TAGs, the primary storage unit for fatty acids. In the methods and host cells described herein, incorporation of long chain PUFAs into TAGs is most desirable, although the structural form of the PUFA is not limiting (thus, for example, EPA may exist in the total lipids as FFAs or in esterified forms such as acylglycerols, phospholipids, sulfolipids or glycolipids). More specifically, in one embodiment of the present method, the at least one PUFA is selected from the group consisting of LA, GLA, EDA, DGLA, ARA, DTA, DPAn-6, ALA, STA, ETrA, ETA, EPA, DPAn-3, DHA and mixtures thereof. More preferably, the at least one PUFA has at least a $C_{20}$ chain length, such as PUFAs selected from the group consisting of EDA, DGLA, ARA, DTA, DPAn-6, ETrA, ETA, EPA, DPAn-3, DHA, and mixtures thereof. In one embodiment, the at least one PUFA is selected from the group consisting of ARA, EPA, DPAn-6, DPAn-3, DHA and mixtures thereof. In another preferred embodiment, the at least one PUFA is selected from the group consisting of EPA and DHA.

Most PUFAs are incorporated into TAGs as neutral lipids and are stored in lipid bodies. However, it is important to note that a measurement of the total PUFAs within an oleaginous organism should minimally include those PUFAs that are located in the phosphatidylcholine, phosphatidyletanolamine and TAG fractions.

The SPD-purified oil comprising at least one PUFA, such as EPA (or derivatives thereof), and having a reduced amount of sterol (relative to a composition not subjected to distillation, as described herein) will have well known clinical and pharmaceutical value. See, e.g., U.S. Pat. Appl. Pub. No. 2009-0093543 A1. For example, lipid compositions comprising PUFAs may be used as dietary substitutes, or supplements, particularly infant formulas, for patients undergoing intravenous feeding or for preventing or treating malnutrition. Alternatively, the purified PUFAs (or derivatives thereof) may be incorporated into cooking oils, fats or margarines formulated so that in normal use the recipient would receive the desired amount for dietary supplementation. The PUFAs may also be incorporated into infant formulas, nutritional supplements or other food products and may find use as anti-inflammatory or cholesterol lowering agents. Optionally, the compositions may be used for pharmaceutical use, either human or veterinary.

Supplementation of humans or animals with PUFAs can result in increased levels of the added PUFAs, as well as their metabolic progeny. For example, treatment with EPA can result not only in increased levels of EPA, but also downstream products of EPA such as eicosanoids (i.e., prostaglandins, leukotrienes, thromboxanes), DPAn-3 and DHA. Complex regulatory mechanisms can make it desirable to combine various PUFAs, or add different conjugates of PUFAs, in order to prevent, control or overcome such mechanisms to achieve the desired levels of specific PUFAs in an individual.

Alternatively, PUFAs, or derivatives thereof, can be utilized in the synthesis of animal and aquaculture feeds, such as dry feeds, semi-moist and wet feeds, since these formulations generally require at least 1-2% of the nutrient composition to be omega-3 and/or omega-6 PUFAs.

Although the present invention is drawn to a process to produce a SPD-purified oil comprising a TAG-containing fraction having a reduced amount of sterol, via distillation of a sterol-containing microbial oil composition using short path distillation conditions, one will appreciate an overview of the related processes that may be useful to obtain the sterol-containing microbial oil composition itself. As diagrammed in FIG. 1 in the form of a flowchart, most processes will begin with a microbial fermentation, wherein a particular microorganism is cultured under conditions that permit growth and production of PUFAs. At an appropriate time, the microbial cells are harvested from the fermentation vessel. This untreated microbial biomass may be mechanically processed using various means, such as drying, disrupting, pelletizing, etc. Oil extraction of the untreated microbial biomass is then performed, producing residual biomass (e.g., cell debris) and extracted oil. Distillation of the extracted oil (which contains sterols and triacylglycerides [TAGs] comprising PUFAs) using short path distillation conditions then reduces the amount of sterols in the purified TAG-fraction (i.e., the SPD-purified microbial oil). Each of these aspects of FIG. 1 will be discussed in further detail below.

The sterol-containing microbial oil useful in the invention is derived from a microbial biomass, typically provided by microbial fermentation. The microbial biomass may be from any microorganism, whether naturally occurring or recombinant, capable of producing a lipid containing a desired PUFA(s). Preferably, the microorganism will be capable of high level PUFA production.

As an example, commercial sources of ARA oil are typically produced from microorganisms in the genera *Mortierella* (filamentous fungus), *Entomophthora*, *Pythium* and *Porphyridium* (red alga). Most notably, Martek Biosciences Corporation (Columbia, Md.) produces an ARA-containing fungal oil (ARASCO®; U.S. Pat. No. 5,658,767) which is substantially free of EPA and which is derived from either *Mortierella alpina* or *Pythium insidiuosum*.

Similarly, EPA can be produced microbially via numerous different processes based on the natural abilities of the specific microbial organism utilized [e.g., heterotrophic diatoms *Cyclotella* sp. and *Nitzschia* sp. (U.S. Pat. No. 5,244,921); *Pseudomonas, Alteromonas* or *Shewanella* species (U.S. Pat. No. 5,246,841); filamentous fungi of the genus *Pythium* (U.S. Pat. No. 5,246,842); *Mortierella elongata, M. exigua,* or *M. hygrophila* (U.S. Pat. No. 5,401,646); and eustigmatophycean alga of the genus *Nannochloropsis* (Krienitz, L. and M. Wirth, *Limnologica*, 36:204-210 (2006))].

DHA can also be produced using processes based on the natural abilities of native microbes. See, e.g., processes developed for *Schizochytrium* species (U.S. Pat. No. 5,340,742; U.S. Pat. No. 6,582,941); *Ulkenia* (U.S. Pat. No. 6,509,178); *Pseudomonas* sp. YS-180 (U.S. Pat. No. 6,207,441); *Thraustochytrium* genus strain LFF1 (U.S. 2004/0161831 A1); *Crypthecodinium cohnii* (U.S. Pat. Appl. Pub. No. 2004/0072330 A1; de Swaaf, M. E. et al., *Biotechnol Bioeng.,* 81(6):666-72 (2003) and *Appl. Microbiol. Biotechnol.,* 61(1): 40-3 (2003)); *Emiliania* sp. (Japanese Patent Publication (Kokai) No. 5-308978 (1993)); and *Japonochytrium* sp. (ATCC #28207; Japanese Patent Publication (Kokai) No. 199588/1989)]. Additionally, the following microorganisms are known to have the ability to produce DHA: *Vibrio marinus* (a bacterium isolated from the deep sea; ATCC #15381); the micro-algae *Cyclotella cryptica* and *Isochrysis galbana*; and, flagellate fungi such as *Thraustochytrium aureum* (ATCC #34304; Kendrick, *Lipids,* 27:15 (1992)) and the *Thraustochytrium* sp. designated as ATCC #28211, ATCC #20890 and ATCC #20891. Currently, there are at least three different fermentation processes for commercial production of DHA: fermentation of *C. cohnii* for production of DHASCO™ (Martek Biosciences Corporation, Columbia, Md.); fermentation of *Schizochytrium* sp. for production of an oil formerly known as DHAGold (Martek Biosciences Corporation); and fermentation of *Ulkenia* sp. for production of DHActive™ (Nutrinova, Frankfurt, Germany).

Microbial production of PUFAs using recombinant means is expected to have several advantages over production from natural microbial sources. For example, recombinant microbes having preferred characteristics for oil production can be used, since the naturally occurring microbial fatty acid profile of the host can be altered by the introduction of new biosynthetic pathways in the host and/or by the suppression of undesired pathways, thereby resulting in increased levels of production of desired PUFAs (or conjugated forms thereof)

and decreased production of undesired PUFAs. Secondly, recombinant microbes can provide PUFAs in particular forms which may have specific uses. Additionally, microbial oil production can be manipulated by controlling culture conditions, notably by providing particular substrate sources for microbially expressed enzymes, or by addition of compounds/genetic engineering to suppress undesired biochemical pathways. Thus, for example, it is possible to modify the ratio of omega-3 to omega-6 fatty acids so produced, or engineer production of a specific PUFA (e.g., EPA) without significant accumulation of other PUFA downstream or upstream products.

Thus, for example, a microbe lacking the natural ability to make EPA can be engineered to express a PUFA biosynthetic pathway by introduction of appropriate PUFA biosynthetic pathway genes, such as specific combinations of delta-4 desaturases, delta-5 desaturases, delta-6 desaturases, delta-12 desaturases, delta-15 desaturases, delta-17 desaturases, delta-9 desaturases, delta-8 desaturases, delta-9 elongases, $C_{14/16}$ elongases, $C_{16/18}$ elongases, $C_{18/20}$ elongases and $C_{20/22}$ elongases, although it is to be recognized that the specific enzymes (and genes encoding those enzymes) introduced are by no means limiting to the invention herein.

Several types of yeast have been recombinantly engineered to produce at least one PUFA. See for example, work in *Saccharomyces cerevisiae* (Dyer, J. M. et al., *Appl. Eniv. Microbiol.*, 59:224-230 (2002); Domergue, F. et al., *Eur. J. Biochem.*, 269:4105-4113 (2002); U.S. Pat. No. 6,136,574; U.S. Pat. Appl. Pub. No. 2006-0051847-A1) and the oleaginous yeast, *Yarrowia lipolytica* (U.S. Pat. No. 7,238,482; U.S. Pat. No. 7,465,564; U.S. Pat. No. 7,588,931; U.S. Pat. No. 7,932,077; U.S. Pat. No. 7,550,286; U.S. Pat. Appl. Pub. No. 2009-0093543-A1; and U.S. Pat. Appl. Pub. No. 2010-0317072-A1).

In some embodiments, advantages are perceived if the microbial host cells are oleaginous. Oleaginous yeast are naturally capable of oil synthesis and accumulation, wherein the total oil content can comprise greater than about 25% of the cellular dry weight, more preferably greater than about 30% of the cellular dry weight, and most preferably greater than about 40% of the cellular dry weight. In alternate embodiments, a non-oleaginous yeast can be genetically modified to become oleaginous such that it can produce more than 25% oil of the cellular dry weight, e.g., yeast such as *Saccharomyces cerevisiae* (Intl Appl. Pub. No. WO 2006/102342).

Genera typically identified as oleaginous yeast include, but are not limited to: *Yarrowia, Candida, Rhodotorula, Rhodosporidium, Cryptococcus, Trichosporon* and *Lipomyces*. More specifically, illustrative oil-synthesizing yeasts include: *Rhodosporidium toruloides, Lipomyces starkeyii, L. lipoferus, Candida revkaufi, C. pulcherrima, C. tropicalis, C. utilis, Trichosporon pullans, T. cutaneum, Rhodotorula glutinus, R. graminis,* and *Yarrowia lipolytica* (formerly classified as *Candida lipolytica*).

Most preferred is the oleaginous yeast *Yarrowia lipolytica*; and, in a further embodiment, most preferred are the *Y. lipolytica* strains designated as ATCC #20362, ATCC #8862, ATCC #18944, ATCC #76982 and/or LGAM S(7)1 (Papanikolaou S., and Aggelis G., *Bioresour. Technol.* 82(1):43-9 (2002)).

In some embodiments, it may be desirable for the oleaginous yeast to be capable of "high-level production", wherein the organism can produce at least about 5-10% of the desired PUFA (i.e., LA, ALA, EDA, GLA, STA, ETrA, DGLA, ETA, ARA, DPA n-6, EPA, DPA n-3 and/or DHA) in the total lipids. More preferably, the oleaginous yeast will produce at least about 10-70% of the desired PUFA(s) in the total lipids. Although the structural form of the PUFA is not limiting, preferably TAGs comprise the PUFA(s).

Thus, the PUFA biosynthetic pathway genes and gene products described herein may be produced in heterologous microbial host cells, particularly in the cells of oleaginous yeasts (e.g., *Yarrowia lipolytica*). Expression in recombinant microbial hosts may be useful for the production of various PUFA pathway intermediates, or for the modulation of PUFA pathways already existing in the host for the synthesis of new products heretofore not possible using the host.

Although numerous oleaginous yeast could be engineered for production of preferred omega-3/omega-6 PUFAs based on the cited teachings provided above, representative PUFA-producing strains of the oleaginous yeast *Yarrowia lipolytica* are described in Table 5. These strains possess various combinations of the following PUFA biosynthetic pathway genes: delta-4 desaturases, delta-5 desaturases, delta-6 desaturases, delta-12 desaturases, delta-15 desaturases, delta-17 desaturases, delta-9 desaturases, delta-8 desaturases, delta-9 elongases, $C_{14/16}$ elongases, $C_{16/18}$ elongases, $C_{18/20}$ elongases and $C_{20/22}$ elongases, although it is to be recognized that the specific enzymes (and genes encoding those enzymes) introduced and the specific PUFAs produced are by no means limiting to the invention herein.

TABLE 5

Lipid Profiles of Representative *Yarrowia lipolytica* Strains Engineered to Produce Omega-3/Omega-6 PUFAs

| Strain | Reference | ATCC Deposit No. | Fatty Acid Content (As A Percent [%] of Total Fatty Acids) | | | | | | | | | | | | | TFAs % DCW |
|---|---|---|---|---|---|---|---|---|---|---|---|---|---|---|---|---|
| | | | 16:0 | 16:1 | 18:0 | 18:1 | 18:2 | 18:3 (ALA) | GLA | 20:2 (EDA) | DGLA | ARA | ETA | EPA | DPA n-3 | DHA | |
| Wildtype | U.S. Pat. No. | #76982 | 14 | 11 | 3.5 | 34.8 | 31 | 0 | 0 | — | — | — | — | — | — | — | — |
| pDMW208 | | — | 11.9 | 8.6 | 1.5 | 24.4 | 17.8 | 0 | 25.9 | — | — | — | — | — | — | — | — |
| pDMW208-D62 | 7,465,564 | — | 16.2 | 1.5 | 0.1 | 17.8 | 22.2 | 0 | 34 | — | — | — | — | — | — | — | — |
| M4 | U.S. Pat. No. 7,932,077 | — | 15 | 4 | 2 | 5 | 27 | 0 | 35 | — | 8 | 0 | 0 | 0 | — | — | — |
| Y2034 | U.S. Pat. No. | — | 13.1 | 8.1 | 1.7 | 7.4 | 14.8 | 0 | 25.2 | — | 8.3 | 11.2 | — | — | — | — | — |
| Y2047 | | PTA-7186 | 15.9 | 6.6 | 0.7 | 8.9 | 16.6 | 0 | 29.7 | — | 0 | 10.9 | — | — | — | — | — |
| Y2214 | 7,588,931 | — | 7.9 | 15.3 | 0 | 13.7 | 37.5 | 0 | 0 | — | 7.9 | 14 | — | — | — | — | — |
| EU | U.S. Pat. No. | — | 19 | 10.3 | 2.3 | 15.8 | 12 | 0 | 18.7 | — | 5.7 | 0.2 | 3 | 10.3 | — | — | 36 |
| Y2072 | | — | 7.6 | 4.1 | 2.2 | 16.8 | 13.9 | 0 | 27.8 | — | 3.7 | 1.7 | 2.2 | 15 | — | — | — |
| Y2102 | 7,932,077 | — | 9 | 3 | 3.5 | 5.6 | 18.6 | 0 | 29.6 | — | 3.8 | 2.8 | 2.3 | 18.4 | — | — | — |
| Y2088 | | — | 17 | 4.5 | 3 | 2.5 | 10 | 0 | 20 | — | 3 | 2.8 | 1.7 | 20 | — | — | — |

TABLE 5-continued

Lipid Profiles of Representative *Yarrowia lipolytica* Strains Engineered to Produce Omega-3/Omega-6 PUFAs

| Strain | Reference | ATCC Deposit No. | 16:0 | 16:1 | 18:0 | 18:1 | 18:2 | 18:3 (ALA) | GLA | 20:2 (EDA) | DGLA | ARA | ETA | EPA | DPA n-3 | DHA | TFAs % DCW |
|---|---|---|---|---|---|---|---|---|---|---|---|---|---|---|---|---|---|
| Y2089 | — | — | 7.9 | 3.4 | 2.5 | 9.9 | 14.3 | 0 | 37.5 | — | 2.5 | 1.8 | 1.6 | 17.6 | — | — | — |
| Y2095 | — | — | 13 | 0 | 2.6 | 5.1 | 16 | 0 | 29.1 | — | 3.1 | 1.9 | 2.7 | 19.3 | — | — | — |
| Y2090 | — | — | 6 | 1 | 6.1 | 7.7 | 12.6 | 0 | 26.4 | — | 6.7 | 2.4 | 3.6 | 26.6 | — | — | 22.9 |
| Y2096 | — | PTA-7184 | 8.1 | 1 | 6.3 | 8.5 | 11.5 | 0 | 25 | — | 5.8 | 2.1 | 2.5 | 28.1 | — | — | 20.8 |
| Y2201 | — | PTA-7185 | 11 | 16.1 | 0.7 | 18.4 | 27 | 0 | — | 3.3 | 3.3 | 1 | 3.8 | 9 | — | — | — |
| Y3000 | U.S. Pat. No. 7,550,286 | PTA-7187 | 5.9 | 1.2 | 5.5 | 7.7 | 11.7 | 0 | 30.1 | — | 2.6 | 1.2 | 1.2 | 4.7 | 18.3 | 5.6 | — |
| Y4001 | U.S. Pat. Appl. Pub. No. 2009-0093543-A1 | — | 4.3 | 4.4 | 3.9 | 35.9 | 23 | 0 | — | 23.8 | 0 | 0 | 0 | — | — | — | — |
| Y4036 | | — | 7.7 | 3.6 | 1.1 | 14.2 | 32.6 | 0 | — | 15.6 | 18.2 | 0 | 0 | — | — | — | — |
| Y4070 | | — | 8 | 5.3 | 3.5 | 14.6 | 42.1 | 0 | — | 6.7 | 2.4 | 11.9 | — | — | — | — | — |
| Y4086 | | — | 3.3 | 2.2 | 4.6 | 26.3 | 27.9 | 6.9 | — | 7.6 | 1 | 0 | 2 | 9.8 | — | — | 28.6 |
| Y4128 | | PTA-8614 | 6.6 | 4 | 2 | 8.8 | 19 | 2.1 | — | 4.1 | 3.2 | 0 | 5.7 | 42.1 | — | — | 18.3 |
| Y4158 | | — | 3.2 | 1.2 | 2.7 | 14.5 | 30.4 | 5.3 | — | 6.2 | 3.1 | 0.3 | 3.4 | 20.5 | — | — | 27.3 |
| Y4184 | | — | 3.1 | 1.5 | 1.8 | 8.7 | 31.5 | 4.9 | — | 5.6 | 2.9 | 0.6 | 2.4 | 28.9 | — | — | 23.9 |
| Y4217 | | — | 3.9 | 3.4 | 1.2 | 6.2 | 19 | 2.7 | — | 2.5 | 1.2 | 0.2 | 2.8 | 48.3 | — | — | 20.6 |
| Y4259 | | — | 4.4 | 1.4 | 1.5 | 3.9 | 19.7 | 2.1 | — | 3.5 | 1.9 | 0.6 | 1.8 | 46.1 | — | — | 23.7 |
| Y4305 | | — | 2.8 | 0.7 | 1.3 | 4.9 | 17.6 | 2.3 | — | 3.4 | 2 | 0.6 | 1.7 | 53.2 | — | — | 27.5 |
| Y4127 | Int'l. App. Pub. No. WO 2008/073367 | PTA-8802 | 4.1 | 2.3 | 2.9 | 15.4 | 30.7 | 8.8 | — | 4.5 | 3.0 | 3.0 | 2.8 | 18.1 | — | — | — |
| Y4184 | | — | 2.2 | 1.1 | 2.6 | 11.6 | 29.8 | 6.6 | — | 6.4 | 2.0 | 0.4 | 1.9 | 28.5 | — | — | 24.8 |
| Y8404 | U.S. Pat. Appl. Pub. No. 2010-0317072-A1 | — | 2.8 | 0.8 | 1.8 | 5.1 | 20.4 | 2.1 | — | 2.9 | 2.5 | 0.6 | 2.4 | 51.1 | — | — | 27.3 |
| Y8406 | | PTA-10025 | 2.6 | 0.5 | 2.9 | 5.7 | 20.3 | 2.8 | — | 2.8 | 2.1 | 0.5 | 2.1 | 51.2 | — | — | 30.7 |
| Y8412 | | PTA-10026 | 2.5 | 0.4 | 2.6 | 4.3 | 19.0 | 2.4 | — | 2.2 | 2.0 | 0.5 | 1.9 | 55.8 | — | — | 27.0 |
| Y8647 | | — | 1.3 | 0.2 | 2.1 | 4.7 | 20.3 | 1.7 | — | 3.3 | 3.6 | 0.7 | 3.0 | 53.6 | — | — | 37.6 |
| Y9028 | | — | 1.3 | 0.2 | 2.1 | 4.4 | 19.8 | 1.7 | — | 3.2 | 2.5 | 0.8 | 1.9 | 54.5 | — | — | 39.6 |
| Y9477 | | — | 2.6 | 0.5 | 3.4 | 4.8 | 10.0 | 0.5 | — | 2.5 | 3.7 | 1.0 | 2.1 | 61.4 | — | — | 32.6 |
| Y9497 | | — | 2.4 | 0.5 | 3.2 | 4.6 | 11.3 | 0.8 | — | 3.1 | 3.6 | 0.9 | 2.3 | 58.7 | — | — | 33.7 |
| Y9502 | | — | 2.5 | 0.5 | 2.9 | 5.0 | 12.7 | 0.9 | — | 3.5 | 3.3 | 0.8 | 2.4 | 57.0 | — | — | 37.1 |
| Y9508 | | — | 2.3 | 0.5 | 2.7 | 4.4 | 13.1 | 0.9 | — | 2.9 | 3.3 | 0.9 | 2.3 | 58.7 | — | — | 34.9 |
| Y8145 | | — | 4.3 | 1.7 | 1.4 | 4.8 | 18.6 | 2.8 | — | 2.2 | 1.5 | 0.6 | 1.5 | 48.5 | — | — | 23.1 |
| Y8259 | | PTA-10027 | 3.5 | 1.3 | 1.3 | 4.8 | 16.9 | 2.3 | — | 1.9 | 1.7 | 0.6 | 1.6 | 53.9 | — | — | 20.5 |
| Y8370 | | — | 3.4 | 1.1 | 1.4 | 4.0 | 15.7 | 1.9 | — | 1.7 | 1.9 | 0.6 | 1.5 | 56.4 | — | — | 23.3 |
| Y8672 | | — | 2.3 | 0.4 | 2.0 | 4.0 | 16.1 | 1.4 | — | 1.8 | 1.6 | 0.7 | 1.1 | 61.8 | — | — | 26.5 |

One of skill in the art will appreciate that the methodology of the present invention is not limited to the *Yarrowia lipolytica* strains described above, nor to the species (i.e., *Yarrowia lipolytica*) or genus (i.e., *Yarrowia*) in which the invention has been demonstrated, as the means to introduce a PUFA biosynthetic pathway into an oleaginous yeast are well known. Instead, any oleaginous yeast or any other suitable microbe capable of producing PUFAs will be equally useful in the present methodologies.

A microbial species producing a lipid containing the desired PUFA(s) may be cultured and grown in a fermentation medium under conditions whereby the PUFA is produced by the microorganism. Typically, the microorganism is fed with a carbon and nitrogen source, along with a number of additional chemicals or substances that allow growth of the microorganism and/or production of the PUFA. The fermentation conditions will depend on the microorganism used, as described in the above citations, and may be optimized for a high content of the PUFA(s) in the resulting biomass.

In general, media conditions may be optimized by modifying the type and amount of carbon source, the type and amount of nitrogen source, the carbon-to-nitrogen ratio, the amount of different mineral ions, the oxygen level, growth temperature, pH, length of the biomass production phase, length of the oil accumulation phase and the time and method of cell harvest. For example, *Yarrowia lipolytica* are generally grown in a complex media such as yeast extract-peptone-dextrose broth (YPD) or a defined minimal media (e.g., Yeast Nitrogen Base (DIFCO Laboratories, Detroit, Mich.) that lacks a component necessary for growth and thereby forces selection of the desired recombinant expression cassettes that enable PUFA production).

When the desired amount of PUFA has been produced by the microorganism, the fermentation medium may be treated to obtain the microbial biomass comprising the PUFA. For example, the fermentation medium may be filtered or otherwise treated to remove at least part of the aqueous component. The fermentation medium and/or the microbial biomass may be pasteurized or treated via other means to reduce the activity of endogenous microbial enzymes that can harm the microbial oil and/or PUFA products.

The microbial biomass may be mechanically processed for example by drying the biomass, disrupting the biomass (e.g., via cellular lysing), pelletizing the biomass, or a combination of these. The untreated microbial biomass may be dried, e.g., to a desired water content, granulated or pelletized for ease of handling, and/or mechanically disrupted e.g., via physical means such as bead beaters, screw extrusion, etc. to provide greater accessibility to the cell contents. The microbial biomass will be referred to as untreated biomass, even after any mechanical processing, since oil extraction has not yet occurred.

As described in U.S. Provisional Application No. 61/441, 836 and U.S. patent application Ser. No. 13/370,597, a preferred method of mechanical processing involves twin-screw extrusion of dried yeast with a grinding agent (e.g., silica, silicate) capable of absorbing oil to provide a disrupted biomass mix, followed by blending a binding agent (e.g., sucrose, lactose, glucose, soluble starch) with said disrupted biomass mix to provide a fixable mix capable of forming a solid pellet, and subsequent forming of solid pellets (e.g., of ~1 mm diameter X 6-10 mm length) from the fixable mix.

Following optional mechanical processing, the microbial oil is separated from other cellular materials that might be present in the microorganism which produced the oil via extraction. Means to extract microbial oils from untreated biomass are well known in the art. These processes will result in residual biomass (i.e., cell debris, etc.) and extracted oil; preferred methods rely on solvent extractions.

In a more preferred embodiment, supercritical $CO_2$ extraction is performed, as disclosed in U.S. Pat. Pub. No. 2011-0263709-A1. This particular methodology subjects the untreated microbial biomass to solvent extraction to remove phospholipids and residual biomass, and then fractionates the resulting extract to produce an extracted oil having a refined lipid composition comprising at least one PUFA, the refined lipid composition enriched in TAGs relative to the oil composition of the untreated microbial biomass.

In some embodiments, the extracted oil may undergo further processing steps, such as degumming (e.g., using phosphoric acid), bleaching (e.g., with silica or clay), and/or deodorization, to result in a refined lipid composition.

According to the invention herein, the extracted oil or refined lipid composition then is subjected to a distillation under short path distillation conditions. Specifically, the distillation step includes at least one pass of the sterol-containing microbial oil through a short path distillation (SPD) still. Commercial SPD stills are well known in the art of chemical engineering. Suitable stills are available, for example, from Pope Scientific (Saukville, Wis.). The SPD still includes an evaporator and a condenser. A typical distillation is controlled by the temperature of the evaporator, the temperature of the condenser, the feed-rate of the oil into the still and the vacuum level of the still.

As one of skill in the art will appreciate, the number of passes through a SPD still will depend on the level of moisture in the sterol-containing microbial oil. If the moisture content is low, a single pass through the SPD still may be sufficient.

Preferably, however, the distillation is a multi-pass process including two or more consecutive passes of the sterol-containing microbial oil through a SPD still. A first pass is typically performed under about 1 to 50 torr pressure, and preferably about 5 to 30 torr, with relatively low surface temperature of the evaporator, for instance, about 100 to 150° C. This results in a dewatered oil, as residual water and low molecular weight organic materials are distilled. The dewatered oil is then passed through the still at higher temperature of the evaporator and lower pressures to provide a distillate fraction enriched in the sterol and a TAG-containing fraction having a reduced amount of the sterol, as compared to the oil not subject to short path distillation. Additional passes of the TAG-containing fraction may be made through the still to remove further sterol. With each additional pass, the distillation temperature may be increased relative to the temperature of the immediately preceding distillation. Preferably, sufficient passes are performed such that the reduction in the amount of the sterol fraction is at least about 40%-70%, preferably at least about 70%-80%, and more preferably greater than about 80%, when compared to the sterol fraction in the sterol-containing microbial oil.

Preferably, the SPD conditions comprise at least one pass of the sterol-containing microbial oil at a vacuum level of not more than 30 mTorr, and preferably not more than 5 mTorr. Preferably, the SPD conditions comprise at least one pass at about 220 to 300° C., and preferably at about 240 to 280° C.

The SPD process results in a TAG-containing fraction (i.e., SPD-purified oil) having a reduced sterol fraction that has improved clarity when compared to the sterol-containing microbial oil composition that has not been subjected to SPD. Improved clarity refers to a lack of cloudiness or opaqueness in the oil. Sterol-containing microbial oil becomes cloudy upon storing at temperatures below about 10° C., due to reduced solubility of the sterol in the oil at lower temperatures. The distillation process acts to remove substantial portions of the sterol fraction, such that the resulting TAG-containing fraction has a reduced amount of sterol present, and thus, remains clear, or substantially clear upon storage at about 10° C. A test method that may be used to evaluate the clarity of the oil is the American Oil Chemists' Society (AOCS) Official Method Cc 11-53 ("Cold Test", *Official Methods and Recommended Practices of the AOCS*, $6^{th}$ ed., Urbana, Ill., AOCS Press, 2009, incorporated herein by reference).

Surprisingly, reducing the amount of sterols in the distillation process can be accomplished without significant degradation of the oil, which is rich in highly unsaturated fatty acids such as EPA. The degradation of the oil may be evaluated based on the PUFA content and chromatographic profiling (as demonstrated in Example 3, infra).

Recovering the TAG-containing fraction may be accomplished by diverting the fraction, after completion of a pass through the evaporator, to a suitable container.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

The following abbreviations are used: "C" is Celsius, "mm" is millimeter, "μm" is micrometer, "μL" is microliter, "mL" is milliliter, "L" is liter, "min" is minute, "mM" is millimolar, "mTorr" is milliTorr, "cm" is centimeter, "g" is gram, "wt" is weight, "h" or "hr" is hour, "temp" or "T" is temperature and "i.d." is inside diameter.

Example 1A

Preparation of Untreated Microbial Biomass Comprising EPA from *Yarrowia lipolytica* Strain Z1978

This example describes recombinant *Yarrowia lipolytica* strain Z1978, engineered for the production of EPA, and means used to culture this strain using a 2-stage fed-batch process. The microbial biomass was pretreated to result in a dried, untreated microbial biomass, having 56.1 EPA % TFAs.

Genotype of *Yarrowia lipolytica* Strain Y9502

The generation of strain Y9502 is described in U.S. Pat. Appl. Pub. No. 2010-0317072-A1, hereby incorporated herein by reference in its entirety. Strain Y9502, derived from *Yarrowia lipolytica* ATCC #20362, was capable of producing about 57.0% EPA relative to the total lipids via expression of a delta-9 elongase/delta-8 desaturase pathway.

The final genotype of strain Y9502 with respect to wildtype *Yarrowia lipolytica* ATCC #20362 was Ura+, Pex3-, unknown 1-, unknown 2-, unknown 3-, unknown 4-, unknown 5-, unknown6-, unknown 7-, unknown 8-, unknown9-, unknown 10-, YAT1::ME3S::Pex16, GPD:: ME3S::Pex20, YAT1::ME3S::Lip1, FBAINm::EgD9eS:: Lip2, EXP1::EgD9eS::Lip1, GPAT::EgD9e::Lip2, YAT1:: EgD9eS::Lip2, FBAINm::EgD8M::Pex20, EXP1::EgD8M:: Pex16, FBAIN::EgD8M::Lip1, GPD::EaD8S::Pex16 (2 copies), YAT1::E389D9eS/EgD8M::Lip1, YAT1::EgD9eS/ EgD8M::Aco, FBAINm::EaD9eS/EaD8S::Lip2, GPD:: FmD12::Pex20, YAT1::FmD12::Oct, EXP1::FmD12S::Aco, GPDIN::FmD12::Pex16, EXP1::EgD5M::Pex16, FBAIN:: EgD5SM::Pex20, GPDIN::EgD5SM::Aco, GPM:: EgD5SM::Oct, EXP1::EgD5SM::Lip1, YAT1::EaD5SM:: Oct, FBAINm::PaD17::Aco, EXP1::PaD17::Pex16, YAT1:: PaD17S::Lip1, YAT1::YICPT::Aco, YAT1::MCS::Lip1, FBA::MCS::Lip1, YAT1::MaLPAAT1S::Pex16. The structure of the above expression cassettes are represented by a simple notation system of "X::Y::Z", wherein X describes the promoter fragment, Y describes the gene fragment, and Z describes the terminator fragment, which are all operably linked to one another. Abbreviations are as follows: FmD12 is a *Fusarium moniliforme* delta-12 desaturase gene [U.S. Pat. No. 7,504,259]; FmD12S is a codon-optimized delta-12 desaturase gene, derived from *Fusarium moniliforme* [U.S. Pat. No. 7,504,259]; MESS is a codon-optimized $C_{16/18}$ elongase gene, derived from *Mortierella alpina* [U.S. Pat. No. 7,470,532]; EgD9e is a *Euglena gracilis* delta-9 elongase gene [U.S. Pat. No. 7,645,604]; EgD9eS is a codon-optimized delta-9 elongase gene, derived from *Euglena gracilis* [U.S. Pat. No. 7,645,604]; EgD8M is a synthetic mutant delta-8 desaturase gene [U.S. Pat. No. 7,709,239], derived from *Euglena gracilis* [U.S. Pat. No. 7,256,033]; EaD8S is a codon-optimized delta-8 desaturase gene, derived from *Euglena anabaena* [U.S. Pat. No. 7,790,156]; E389D9eS/ EgD8M is a DGLA synthase created by linking a codon-optimized delta-9 elongase gene ("E389D9eS"), derived from *Eutreptiella* sp. CCMP389 delta-9 elongase (U.S. Pat. No. 7,645,604) to the delta-8 desaturase "EgD8M" (supra) [U.S. Pat. Appl. Pub. No. 2008-0254191-A1]; EgD9eS/ EgD8M is a DGLA synthase created by linking the delta-9 elongase "EgD9eS" (supra) to the delta-8 desaturase "EgD8M" (supra) [U.S. Pat. Appl. Pub. No. 2008-0254191-A1]; EaD9eS/EgD8M is a DGLA synthase created by linking a codon-optimized delta-9 elongase gene ("EaD9eS"), derived from *Euglena anabaena* delta-9 elongase [U.S. Pat. No. 7,794,701] to the delta-8 desaturase "EgD8M" (supra) [U.S. Pat. Appl. Pub. No. 2008-0254191-A1]; EgD5M and EgD5SM are synthetic mutant delta-5 desaturase genes [U.S. Pat. App. Pub. 2010-0075386-A1], derived from *Euglena gracilis* [U.S. Pat. No. 7,678,560]; EaD5SM is a synthetic mutant Δ5 desaturase gene [U.S. Pat. App. Pub. 2010-0075386-A1], derived from *Euglena anabaena* [U.S. Pat. No. 7,943,365]; PaD17 is a *Pythium aphanidermatum* delta-17 desaturase gene [U.S. Pat. No. 7,556,949]; PaD17S is a codon-optimized delta-17 desaturase gene, derived from *Pythium* aphanidermatum [U.S. Pat. No. 7,556,949]; YICPT1 is a *Yarrowia lipolytica* diacylglycerol cholinephosphotransferase gene [U.S. Pat. No. 7,932,077]; MCS is a codon-optimized malonyl-CoA synthetase gene, derived from *Rhizobium leguminosarum* bv. viciae 3841 [U.S. Pat. App. Pub. 2010-0159558-A1]; and, MaLPAAT1S is a codon-optimized lysophosphatidic acid acyltransferase gene, derived from *Mortierella alpina* [U.S. Pat. No. 7,879,591].

For a detailed analysis of the total lipid content and composition in strain Y9502, a flask assay was conducted wherein cells were grown in 2 stages for a total of 7 days. Based on analyses, strain Y9502 produced 3.8 g/L dry cell weight ["DCW"], total lipid content of the cells was 37.1 ["TFAs % DCW"], the EPA content as a percent of the dry cell weight ["EPA % DCW"] was 21.3, and the lipid profile was as follows, wherein the concentration of each fatty acid is as a weight percent of TFAs ["% TFAs"]: 16:0 (palmitate)-2.5, 16:1 (palmitoleic acid)—0.5, 18:0 (stearic acid)—2.9, 18:1 (oleic acid)—5.0, 18:2 (LA)—12.7, ALA—0.9, EDA—3.5, DGLA—3.3, ARA—0.8, ETrA—0.7, ETA—2.4, EPA—57.0, other—7.5.

Generation of *Yarrowia lipolytica* Strain Z1978 from Strain Y9502

The development of strain Z1978 from strain is described in U.S. Pat. application Ser. No. 13/218,591 and Ser. No. 13/218,708, hereby incorporated herein by reference.

Figure 2A:
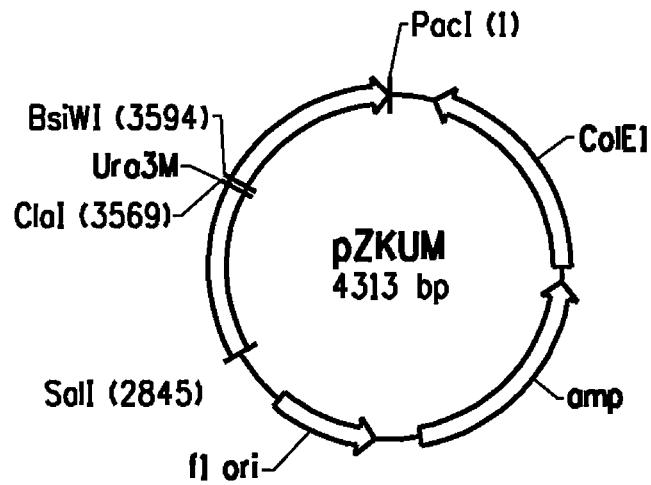

Specifically, to disrupt the Ura3 gene in strain Y9502, construct pZKUM (FIG. 2A; SEQ ID NO:1; described in Table 15 of U.S. Pat. Appl. Pub. No. 2009-0093543-A1) was used to integrate an Ura3 mutant gene into the Ura3 gene of strain Y9502. Transformation was performed according to the methodology of U.S. Pat. Appl. Pub. No. 2009-0093543-A1, hereby incorporated herein by reference. A total of 27 transformants (selected from a first group comprising 8 transformants, a second group comprising 8 transformants, and a third group comprising 11 tranformants) were grown on 5-fluoroorotic acid ["FOA"] plates (FOA plates comprise per liter: 20 g glucose, 6.7 g Yeast Nitrogen base, 75 mg uracil, 75 mg uridine and an appropriate amount of FOA (Zymo Research Corp., Orange, Calif.), based on FOA activity testing against a range of concentrations from 100 mg/L to 1000 mg/L (since variation occurs within each batch received from the supplier)). Further experiments determined that only the third group of transformants possessed a real Ura-phenotype.

For fatty acid ["FA"] analysis, cells were collected by centrifugation and lipids were extracted as described in Bligh, E. G. & Dyer, W. J. (*Can. J. Biochem. Physiol.*, 37:911-917 (1959)). Fatty acid methyl esters ["FAMEs"] were prepared by transesterification of the lipid extract with sodium methoxide (Roughan, G., and Nishida I., *Arch Biochem Biophys.*, 276(1):38-46 (1990)) and subsequently analyzed with a Hewlett-Packard 6890 GC fitted with a 30-m×0.25 mm (i.d.) HP-INNOWAX (Hewlett-Packard) column. The oven temperature was from 170° C. (25 min hold) to 185° C. at 3.5° C./min.

For direct base transesterification, *Yarrowia* cells (0.5 mL culture) were harvested, washed once in distilled water, and dried under vacuum in a Speed-Vac for 5-10 min. Sodium methoxide (100 μl of 1%) and a known amount of C15:0 triacylglycerol (C15:0 TAG; Cat. No. T-145, Nu-Check Prep, Elysian, Minn.) was added to the sample, and then the sample was vortexed and rocked for 30 min at 50° C. After adding 3 drops of 1 M NaCl and 400 μl hexane, the sample was vortexed and spun. The upper layer was removed and analyzed by GC (supra).

Alternately, a modification of the base-catalysed transersterification method described in *Lipid Analysis*, William W.

Christie, 2003 was used for routine analysis of the broth samples from either fermentation or flask samples. Specifically, broth samples were rapidly thawed in room temperature water, then weighed (to 0.1 mg) into a tarred 2 mL microcentrifuge tube with a 0.22 μm Corning® Costar® Spin-X® centrifuge tube filter (Cat. No. 8161). Sample (75-800 μl) was used, depending on the previously determined DCW. Using an Eppendorf 5430 centrifuge, samples are centrifuged for 5-7 min at 14,000 rpm or as long as necessary to remove the broth. The filter was removed, liquid was drained, and ~500 μl of deionized water was added to the filter to wash the sample. After centrifugation to remove the water, the filter was again removed, the liquid drained and the filter re-inserted. The tube was then re-inserted into the centrifuge, this time with the top open, for ~3-5 min to dry. The filter was then cut approximately ½ way up the tube and inserted into a fresh 2 mL round bottom Eppendorf tube (Cat. No. 22 36 335-2).

The filter was pressed to the bottom of the tube with an appropriate tool that only touches the rim of the cut filter container and not the sample or filter material. A known amount of C15:0 TAG (supra) in toluene was added and 500 μl of freshly made 1% sodium methoxide in methanol solution. The sample pellet was firmly broken up with the appropriate tool and the tubes were closed and placed in a 50° C. heat block (VWR Cat. No. 12621-088) for 30 min. The tubes were then allowed to cool for at least 5 min. Then, 400 μl of hexane and 500 μl of a 1 M NaCl in water solution were added, the tubes were vortexed for 2×6 sec and centrifuged for 1 min. Approximately 150 μl of the top (organic) layer was placed into a GC vial with an insert and analyzed by GC.

FAME peaks recorded via GC analysis were identified by their retention times, when compared to that of known fatty acids, and quantitated by comparing the FAME peak areas with that of the internal standard (C15:0 TAG) of known amount. Thus, the approximate amount (4) of any fatty acid FAME ["μg FAME"] is calculated according to the formula: (area of the FAME peak for the specified fatty acid/area of the standard FAME peak)*(μg of the standard C15:0 TAG), while the amount (μg) of any fatty acid ["μg FA"] is calculated according to the formula: (area of the FAME peak for the specified fatty acid/area of the standard FAME peak)*(μg of the standard C15:0 TAG)*0.9503, since 1 μg of C15:0 TAG is equal to 0.9503 μg fatty acids. Note that the 0.9503 conversion factor is an approximation of the value determined for most fatty acids, which range between 0.95 and 0.96.

The lipid profile, summarizing the amount of each individual fatty acid as a weight percent of TFAs, was determined by dividing the individual FAME peak area by the sum of all FAME peak areas and multiplying by 100.

In this way, GC analyses showed that there were 28.5%, 28.5%, 27.4%, 28.6%, 29.2%, 30.3% and 29.6% EPA of TFAs in pZKUM-transformants #1, #3, #6, #7, #8, #10 and #11 of group 3, respectively. These seven strains were designated as strains Y9502U12, Y9502U14, Y9502U17, Y9502U18, Y9502U19, Y9502U21 and Y9502U22, respectively (collectively, Y9502U).

Figure 2B:
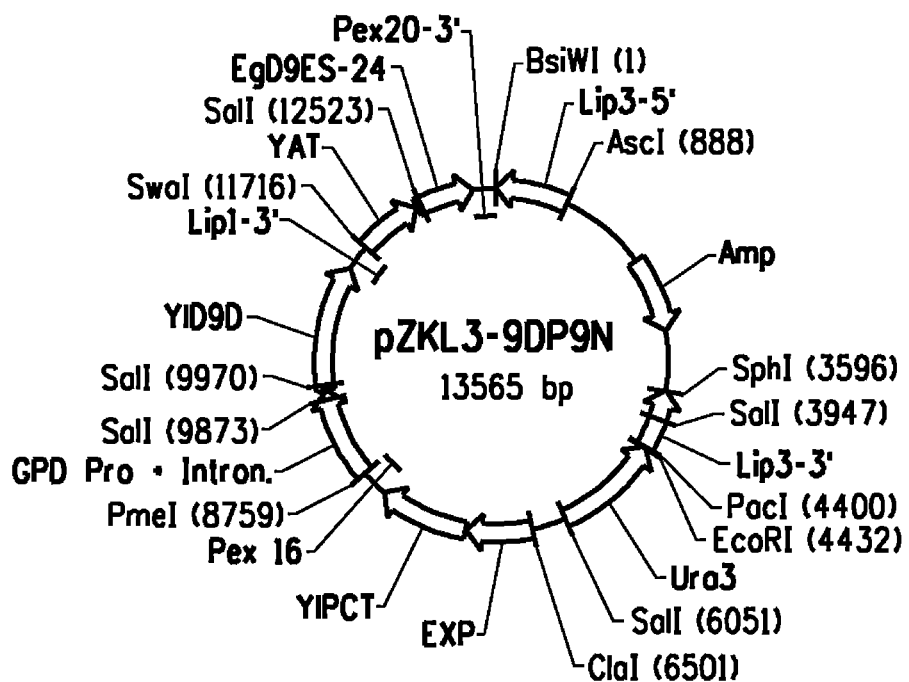

Construct pZKL3-9DP9N (FIG. 2B; SEQ ID NO:2) was then generated to integrate one delta-9 desaturase gene, one choline-phosphate cytidylyl-transferase gene, and one delta-9 elongase mutant gene into the *Yarrowia* YALI0F32131p locus (GenBank Accession No. XM_506121) of strain Y9502U. The pZKL3-9DP9N plasmid contained the following components:

TABLE 6

Description of Plasmid pZKL3-9DP9N (SEQ ID NO: 2)

| RE Sites And Nucleotides Within SEQ ID NO: 2 | Description Of Fragment And Chimeric Gene Components |
|---|---|
| AscI/BsiWI (887-4) | 884 by 5' portion of YALI0F32131p locus (GenBank Accession No. XM_506121, labeled as "Lip3-5" in Figure) |
| PacI/SphI (4396-3596) | 801 bp 3' portion of YALI0F32131p locus (GenBank Accession No. XM_506121, labeled as "Lip3-3" in Figure) |
| SwaI/BsiWI (11716-1) | YAT1::EgD9eS-L35G::Pex20, comprising: YAT1: *Yarrowia lipolytica* YAT1 promoter (labeled as "YAT" in Figure; U.S. Pat. Appl. Pub. No. 2010-0068789A1); EgD9eS-L35G: Synthetic mutant of delta-9 elongase gene (SEQ ID NO: 3; U.S Pat. Appl. No. 13/218591), derived from *Euglena gracilis* ("EgD9eS"; U.S. Pat. No. 7,645,604); Pex20: Pex20 terminator sequence from *Yarrowia* Pex20 gene (GenBank Accession No. AF054613) |
| PmeI/SwaI (8759-11716) | GPDIN::YID9::Lip1, comprising: GPDIN: *Yarrowia lipolytica* GPDIN promoter (U.S. Pat. No. 7,459,546); YID9: *Yarrowia lipolytica* delta-9 desaturase gene (GenBank Accession No. XM_501496; SEQ ID NO: 5); Lip1: Lip1 terminator sequence from *Yarrowia* Lip1 gene (GenBank Accession No. Z50020) |
| ClaII/PmeI (6501-8759) | EXP::YIPCT::Pex16, comprising: EXP1: *Yarrowia lipolytica* export protein (EXP1) promoter (labeled as "Exp" in Figure; U.S. Pat. 7,932,077); YIPCT: *Yarrowia lipolytica* choline-phosphate cytidylyl-transferase ["PCT"] gene (GenBank Accession No.XM_502978; SEQ ID NO: 7); Pex16: Pex16 terminator sequence from *Yarrowia* Pex16 gene (GenBank Accession No. U75433) |
| SaII/EcoRI (6501-4432) | *Yarrowia* Ura3 gene (GenBank Accession No. AJ306421) |

The pZKL3-9DP9N plasmid was digested with AscI/SphI, and then used for transformation of strain Y9502U17. The transformant cells were plated onto Minimal Media ["MM"] plates and maintained at 30° C. for 3 to 4 days (Minimal Media comprises per liter: 20 g glucose, 1.7 g yeast nitrogen base without amino acids, 1.0 g proline, and pH 6.1 (do not need to adjust)). Single colonies were re-streaked onto MM plates, and then inoculated into liquid MM at 30° C. and shaken at 250 rpm/min for 2 days. The cells were collected by centrifugation, resuspended in High Glucose Media ["HGM"] and then shaken at 250 rpm/min for 5 days (High Glucose Media comprises per liter: 80 glucose, 2.58 g $KH_2PO_4$ and 5.36 g $K_2HPO_4$, pH 7.5 (do not need to adjust)). The cells were subjected to fatty acid analysis, supra.

GC analyses showed that most of the selected 96 strains of Y9502U17 with pZKL3-9DP9N produced 50-56% EPA of TFAs. Five strains (i.e., #31, #32, #35, #70 and #80) that produced about 59.0%, 56.6%, 58.9%, 56.5%, and 57.6% EPA of TFAs were designated as Z1977, Z1978, Z1979, Z1980 and Z1981 respectively.

The final genotype of these pZKL3-9DP9N transformant strains with respect to wildtype *Yarrowia lipolytica* ATCC #20362 was Ura+, Pex3-, unknown 1-, unknown 2-, unknown 3-, unknown 4-, unknown 5-, unknown6-, unknown 7-, unknown 8-, unknown9-, unknown 10-, unknown 11-, YAT1:: ME3S::Pex16, GPD::ME3S::Pex20, YAT1::ME3S::Lip1, FBAINm::EgD9eS::Lip2, EXP1::EgD9eS::Lip1, GPAT:: EgD9e::Lip2, YAT1::EgD9eS::Lip2, YAT::EgD9eS-L35G:: Pex20, FBAINm::EgD8M::Pex20, EXP1::EgD8M::Pex16, FBAIN::EgD8M::Lip1, GPD::EaD8S::Pex16 (2 copies), YAT1::E389D9eS/EgD8M::Lip1, YAT1::EgD9eS/EgD8M:: Aco, FBAINm::EaD9eS/EaD8S::Lip2, GPDIN::YID9::

Lip1, GPD::FmD12::Pex20, YAT1::FmD12::Oct, EXP1::FmD12S::Aco, GPDIN::FmD12::Pex16, EXP1::EgD5M::Pex16, FBAIN::EgD5SM::Pex20, GPDIN::EgD5SM::Aco, GPM::EgD5SM::Oct, EXP1::EgD5SM::Lip1, YAT1::EaD5SM::Oct, FBAINm::PaD17::Aco, EXP1::PaD17::Pex16, YAT1::PaD17S::Lip1, YAT1::YICPT::Aco, YAT1::MCS::Lip1, FBA::MCS::Lip1, YAT1::MaLPAAT1S::Pex16, EXP1::YIPCT::Pex16.

Knockout of the YALI0F32131p locus (GenBank Accession No. XM_50612) in strains Z1977, Z1978, Z1979, Z1980 and Z1981 was not confirmed in any of these EPA strains produced by transformation with pZKL3-9DP9N.

Cells from YPD plates of strains Z1977, Z1978, Z1979, Z1980 and Z1981 were grown and analyzed for total lipid content and composition, according to the methodology below.

For a detailed analysis of the total lipid content and composition in a particular strain of *Y. lipolytica*, flask assays were conducted as followed. Specifically, one loop of freshly streaked cells was inoculated into 3 mL Fermentation Medium ["FM"] medium and grown overnight at 250 rpm and 30° C. (Fermentation Medium comprises per liter: 6.70 g/L yeast nitrogen base, 6.00 g $KH_2PO_4$, 2.00 g $K_2HPO_4$, 1.50 g $MgSO_4*7H_2O$, 20 g glucose and 5.00 g yeast extract (BBL)). The $OD_{600nm}$ was measured and an aliquot of the cells was added to a final $OD_{600nm}$ of 0.3 in 25 mL FM medium in a 125 mL flask. After 2 days in a shaker incubator at 250 rpm and at 30° C., 6 mL of the culture was harvested by centrifugation and resuspended in 25 mL HGM in a 125 mL flask. After 5 days in a shaker incubator at 250 rpm and at 30° C., a 1 mL aliquot was used for fatty acid analysis (supra) and 10 mL dried for dry cell weight ["DCW"] determination.

For DCW determination, 10 mL culture was harvested by centrifugation for 5 min at 4000 rpm in a Beckman GH-3.8 rotor in a Beckman GS-6R centrifuge. The pellet was resuspended in 25 mL of water and re-harvested as above. The washed pellet was re-suspended in 20 mL of water and transferred to a pre-weighed aluminum pan. The cell suspension was dried overnight in a vacuum oven at 80° C. The weight of the cells was determined.

Total lipid content of cells ["TFAs % DCW"] is calculated and considered in conjunction with data tabulating the concentration of each fatty acid as a weight percent of TFAs ["% TFAs"] and the EPA content as a percent of the dry cell weight ["EPA % DCW"].

Thus, Table 7 below summarizes total lipid content and composition of strains Z1977, Z1978, Z1979, Z1980 and Z1981, as determined by flask assays. Specifically, the Table summarizes the total dry cell weight of the cells ["DCW"], the total lipid content of cells ["TFAs % DCW"], the concentration of each fatty acid as a weight percent of TFAs ["% TFAs"] and the EPA content as a percent of the dry cell weight ["EPA % DCW"].

Fermentation of *Yarrowia lipolytica* Strain Z1978

Inocula were prepared from frozen cultures of *Yarrowia lipolytica* strain Z1978 in a shake flask. After an incubation period, the culture was used to inoculate a seed fermentor. When the seed culture reached an appropriate target cell density, it was then used to inoculate a larger fermentor. The fermentation was a 2-stage fed-batch process. In the first stage, the yeast were cultured under conditions that promoted rapid growth to a high cell density; the culture medium comprised glucose, various nitrogen sources, trace metals and vitamins. In the second stage, the yeast were starved for nitrogen and continuously fed glucose to promote lipid and PUFA accumulation. Process variables including temperature (controlled between 30-32° C.), pH (controlled between 5-7), dissolved oxygen concentration and glucose concentration were monitored and controlled per standard operating conditions to ensure consistent process performance and final PUFA oil quality.

One of skill in the art of fermentation will know that variability will occur in the oil profile of a specific *Yarrowia* strain, depending on the fermentation run itself, media conditions, process parameters, scale-up, etc., as well as the particular time-point in which the culture is sampled (see, e.g., U.S. Pat. Appl. Pub. No. 2009-0093543-A1).

After fermentation, the yeast biomass was dewatered and washed to remove salts and residual medium, and to minimize lipase activity. Drum drying followed, to reduce the moisture to less than 5% to ensure oil stability during short term storage and transportation.

Characterization of the Dried and Untreated *Yarrowia lipolytica* Strain Z1978 Biomass The fatty acid composition of the dried and untreated yeast biomass was analyzed using the following gas chromatography ["GC"] method. Specifically, the triglycerides were converted to fatty acid methyl esters ["FAMEs"] by transesterification using sodium methoxide in methanol. The resulting FAMEs were analyzed using an Agilent 7890 GC fitted with a 30-m×0.25 mm (i.d.) OMEGAWAX (Supelco) column after dilution in toluene/hexane (2:3). The oven temperature was increased from 160° C. to 200° C. at 5° C./min, and then 200° C. to 250° C. (hold for 10 min) at 10° C./min.

FAME peaks recorded via GC analysis were identified by their retention times, when compared to that of known methyl esters ["MEs"], and quantitated by comparing the FAME peak areas with that of the internal standard (C15:0 triglyceride, taken through the transesterification procedure with the sample) of known amount. Thus, the approximate amount (mg) of any fatty acid FAME ["mg FAME"] is calculated according to the formula: (area of the FAME peak for the specified fatty acid/area of the 15:0 FAME peak)*(mg of the internal standard C15:0 FAME). The FAME result can then

TABLE 7

Total Lipid Content And Composition In *Yarrowia* Strains Z1977, Z1978, Z1979, Z1980 and Z1981 By Flask Assay

| Strain | DCW (g/L) | TFAs % DCW | % TFAs | | | | | | | | | | | | | EPA % DCW |
|---|---|---|---|---|---|---|---|---|---|---|---|---|---|---|---|---|
| | | | 16:0 | 16:1 | 18:0 | 18:1 | 18:2 | ALA | EDA | DGLA | ARA | EtrA | ETA | EPA | other | |
| Z1977 | 3.8 | 34.3 | 2.0 | 0.5 | 1.9 | 4.6 | 11.2 | 0.7 | 3.1 | 3.3 | 0.9 | 0.7 | 2.2 | 59.1 | 9.9 | 20.3 |
| Z1978 | 3.9 | 38.3 | 2.4 | 0.4 | 2.4 | 4.8 | 11.1 | 0.7 | 3.2 | 3.3 | 0.8 | 0.6 | 2.1 | 58.7 | 9.5 | 22.5 |
| Z1979 | 3.7 | 33.7 | 2.3 | 0.4 | 2.4 | 4.1 | 10.5 | 0.6 | 3.2 | 3.6 | 0.9 | 0.6 | 2.2 | 59.4 | 9.8 | 20.0 |
| Z1980 | 3.6 | 32.7 | 2.1 | 0.4 | 2.2 | 4.0 | 10.8 | 0.6 | 3.1 | 3.5 | 0.9 | 0.7 | 2.2 | 59.5 | 10.0 | 19.5 |
| Z1981 | 3.5 | 34.3 | 2.2 | 0.4 | 2.1 | 4.2 | 10.6 | 0.6 | 3.3 | 3.4 | 1.0 | 0.8 | 2.2 | 58.5 | 10.7 | 20.1 | be corrected to mg of the corresponding fatty acid by dividing by the appropriate molecular weight conversion factor of 1.042-1.052.

The lipid profile, summarizing the amount of each individual fatty acid as a weight percent of TFAs, was approximated (to within ±0.1 weight %) by dividing the individual FAME peak area by the sum of all FAME peak areas and multiplying by 100.

The dried and untreated yeast biomass from *Yarrowia lipolytica* strain Z1978 contained 56.1 EPA % TFAs, as shown in Table 8.

TABLE 8

Fatty Acid Composition Of Dried And Untreated Z1978 Biomass

| Fatty acid | Weight Percent Of Total Fatty Acids |
| --- | --- |
| C18:2 (omega-6) | 14.2 |
| C20:5 EPA | 56.1 |
| C22:6 DHA | non-detectable (<0.05) |
| Other components | 29.7 |

Example 1B

Preparation of a SPD-Purified Microbial Oil Having Reduced Sterol Content from Untreated *Yarrowia lipolytica* Strain Z1978 Biomass The present Example describes means used to disrupt the dried and untreated *Yarrowia lipolytica* strain Z1978 biomass of Example 1A via extrusion and pelletization, extract the oil using supercritical fluid extraction ["SCFE"], and reduce the sterol content of the oil by distillation, using short path distillation conditions.

Disruption and Pelletization Via Extrusion of Dried, Untreated Yeast Biomass

The dried and untreated *Yarrowia lipolytica* strain Z1978 biomass of Example 1A was fed to a twin screw extruder. Specifically, a mixture of 84 weight percent yeast (containing approximately 39% total microbial oil) and 16% diatomaceous earth (Celatom MN-4; EP Minerals, LLC, Reno, Nev.) was fed to a 40 mm twin screw extruder (Coperion Werner Pfleiderer ZSK-40 mm MC, Stuttgart, Germany) at a rate of 23 kg/hr. A water/sucrose solution made of 26.5% sucrose was injected after the disruption zone of the extruder at a flow rate of 70 mL/min. The extruder was operated with a 37 kW motor and high torque shaft, at 140 rpm. The % torque range was 17-22. The resulting disrupted yeast powder was cooled to 35° C. in a final water cooled barrel. The moist extruded powder was fed into a LCI Multi-Granulator Model No. MG-55 (LCI Corporation, Charlotte, N.C.) assembled with a 1 mm hole diameter by 1 mm thick screen and set to 80 RPM. Extrudate was formed at 27 kg/hr with a steady 2.2 amp current draw and was dried using conventional drying equipment. Dried pellets, approximately 1 mm diameter X 6 to 10 mm in length, had a final moisture content of 1.7%, as measured on a Sartorius MA35 moisture analyzer (Sartorius AG, Goettingen, Germany).

Extraction of the Extruded Yeast Biomass

The extruded yeast pellets were extracted using supercritical fluid phase carbon dioxide ($CO_2$) as the extraction solvent to produce a triglyceride-rich extracted oil containing EPA. Specifically, the yeast pellets were charged to a 320 L stainless steel extraction vessel and packed between plugs of polyester foam filtration matting (Aero-Flo Industries, Kingsbury, Ind.). The vessel was sealed, and then $CO_2$ was metered by a commercial compressor (Pressure Products Industries) through a heat exchanger (pre-heater) and fed into the vertical extraction vessel to extract the triglyceride-rich oil from the pellets of disrupted yeast. The extraction temperature was controlled by the pre-heater, and the extraction pressure was maintained with an automated control valve (Kammer) located between the extraction vessel and a separator vessel. The $CO_2$ and oil extract were expanded to a lower pressure through this control valve. The extracted oil was collected from the expanded solution as a precipitate in the separator. The temperature of the expanded $CO_2$ phase in the separator was controlled by use of an additional heat exchanger located upstream of the separator. This lower pressure $CO_2$ stream exited the top of the separator vessel and was recycled back to the compressor through a filter, a condenser, and a mass flow meter. The extracted oil was periodically drained from the separator and collected as product.

The extraction vessel was initially charged with 150 kg of the extruded yeast pellets. The triglyceride-rich oil was then extracted from the pellets with supercritical fluid $CO_2$ at 5000 psig (345 bar), 55° C., and a solvent-to-feed ratio of 32 kg $CO_2$ per kg of starting yeast pellets. A total of 39.6 kg of extracted oil was collected from the separator vessel, to which was added about 1000 ppm each of two antioxidants: Covi-ox T70 (Cognis, Ontario, Canada) and Dadex RM (Nealanders, Ontario, Canada). The extracted oil contained 661 mg ergosterol/100 g of oil, as determined by GC analysis (infra).

Specifically, ergosterol content was determined by high-performance liquid chromatography (HPLC) with ultraviolet (UV) detection. Extracted oil samples (100 mg) were diluted with 14 mL of 9:10 2-propanol:1-heptanol and mixed well. Calibration standards of 96% pure ergosterol (Alfa Aesar, Inc., Ward Hill, Mass.) were prepared in the range of 10 to 300 µg/mL in 2-propanol. Samples and standards were chromatographed on a XDB-C8 HPLC column (4.6 mm id., 150 mm length, 5 µm particle size, Agilent Technologies, Inc., Wilmington, Del.) using an 0.02% ammonium carbonate in water—acetonitrile gradient from 65 to 100% acetonitrile in 12.5 min. The injection volume was 5 µL, the flow rate was 1.2 mL/min and the column temperature was 50° C. The UV (282 nm) response of the ergosterol peak was compared with those of the calibration standards analyzed under the same conditions.

Distillation Under SPD Conditions

The extracted oil was degassed and then passed through a 6" stainless steel molecular still (POPE Scientific, Saukville, Wis.) using a feed rate of 12 kg/hr to remove residual water. The surface temperatures of the evaporator and condenser were set at 140° C. and 15° C., respectively. The vacuum was maintained at 15 torr. Approximately 3 wt. % of the extracted oil was removed as water in the distillate. The dewatered, extracted oil was substantially free of phospholipids, containing 0.5 ppm of phosphorous. Upon visual inspection, the dewatered, extracted oil was cloudy at room temperature.

The dewatered, extracted oil was passed through the 6" molecular still at a feed rate of 12 kg/hr for a second time. The vacuum was lowered to 1 mtorr, and the surface temperatures of the evaporator and condenser were maintained at 240° C. and 50° C., respectively. Approximately 7 wt. % of the dewatered, extracted oil was removed as the distillate; this fraction contained mainly free fatty acids and ergosterol. A triacylglycerol-containing fraction (i.e., the SPD-purified oil) was also obtained, containing 284 mg ergosterol/100 g oil (a ~57% reduction in ergosterol content, when compared to ergosterol content in the extracted oil). The SPD-purified oil was clear after being stored at 10° C. for several days.

Example 2

Preparation of a SPD-Purified Microbial Oil Having Reduced Sterol Content from Untreated *Yarrowia lipolytica* Strain Y9502 Biomass The present Example describes means used to disrupt dried and untreated *Yarrowia lipolytica* strain Y9502 biomass via extrusion, extract the oil using supercritical fluid extraction ["SCFE"], and reduce the sterol content of the oil by distillation, using short path distillation conditions.

Preparation of Dried and Untreated *Yarrowia lipolytica* Strain Y9502 Biomass

*Yarrowia lipolytica* strain Y9502 (Example 1A) was cultured in a 2-stage fed-batch process and the resulting microbial biomass was dewatered, washed and dried, according to the methodology set forth in Example 1A.

Disruption Via Extrusion of Dried, Untreated Yeast Biomass

The dried and untreated *Yarrowia lipolytica* strain Y9502 biomass was fed to a twin screw extruder. Specifically, the yeast biomass (containing approximately 37% total microbial oil) was fed to a 70 mm twin screw extruder (Coperion Werner Pfleiderer ZSK-70 mm SCD, Stuttgart, Germany) at a rate of 270 kg/hr, in the absence of diatomaceous earth.

The extruder was operated with a 150 kW motor and high torque shaft at 150 rpm and 33 percent of the total amp range. The resulting disrupted yeast biomass was cooled to 81° C. in the final water cooled barrel. The moisture content of the disrupted biomass was 2.8 wt. ° A), as measured on a Sartorius MA35 moisture analyzer (Sartorius AG, Goettingen, Germany).

Extraction of the Extruded Yeast Biomass

The extruded yeast biomass was mixed with diatomaceous earth to prevent bed compaction and extracted using supercritical fluid phase carbon dioxide ($CO_2$) as the extraction solvent to produce a crude triglyceride oil containing EPA (i.e., "Extracted oil"). Specifically, a total of 82.7 kg of the extruded yeast biomass was mixed with 41 kg of diatomaceous earth (Celatom MN-4; EP Minerals, LLC, Reno, Nev.) and charged to a 320 L stainless steel extraction vessel, configured in a manner identical to that described in Example 1B, with the following exceptions: (i) the extraction temperature was controlled to 40° C. by the pre-heater; (ii) the extraction pressure was maintained at 4500 psig (310 bar); (iii) a solvent-to-feed ratio of 44 kg $CO_2$ per kg of starting yeast was used for the extraction. In this way, 23.2 kg oil was extracted from the disrupted yeast. The extracted oil contained 774 mg ergosterol/100 g oil, as determined by GC analysis according to the methodology of Example 1B.

Distillation Under SPD Conditions

The extracted oil was passed through a 2" glass molecular still to provide a dewatered, extracted oil. The flow rate was maintained at approximately 480 g/hr. The vacuum, evaporator and condenser temperatures were 0.2 mm Hg, 130° C. and 60° C., respectively. The dewatered, extracted oil was then passed through the still three times at different temperatures at a vacuum of 1 mtorr, as shown in the Table below. After each pass, the ergosterol level, EPA content (as a wt. % of TFAs) and total Omega-3 content (as a wt. % of TFAs) in the triacylglycerol-containing fraction (i.e., the SPD-purified oil) were determined, as previously described.

TABLE 9

Ergosterol And PUFA Content In SPD-Purified Oil

|  | Pass 1 | Pass 2 | Pass 3 |
|---|---|---|---|
| Temperature (° C.) | 210 | 240 | 270 |
| Ergosterol (mg/100 g) | 110 | 52.8 | 1.21 |
| C20:5 EPA (wt. % TFAs) | 54.9 | 55.2 | 55.4 |
| Total Omega-3 (wt. % TFAs) | 57.51 | 57.92 | 57.18 |

Thus, at 210° C., the ergosterol level in the SPD-purified oil was 110 mg/100 g of oil and it was reduced to about 53 mg/100 g of oil at 240° C. The ergosterol was almost completely removed to 1 mg/100 g of oil when the temperature was further increased to 270° C. This corresponds to a ~57%, ~86% and ~99.8% reduction in ergosterol content in Pass 1, Pass 2 and Pass 3, respectively, when compared to ergosterol content in the extracted oil.

With respect to the PUFA content in the SPD-purified oil, the data of Table 9 demonstrate that no significant degradation of EPA or total Omega-3 content occurred, even when the oil was passed through the SPD still at 270° C.

The SPD-purified oil of Pass 3 was further analyzed for the appearance of unexpected components and contaminants using chromatographic profiling. Specifically, testing was done by: (i) gas chromatography with flame ionization detection (GC/FID); (ii) thin-layer chromatography (TLC); and, (iii) liquid chromatography with mass spectrometric, light scattering and ultraviolet detection (HPLC/MS/ELSD/UV). The GC/FID profile was run on the methyl esters of the SPD-purified oil sample. The TLC and HPLC/MS/ELSD/UV profiles were run on the SPD-purified oil directly. In all cases, the SPD-purified oil profile was compared with a reference oil prepared with *Yarrowia lipolytica* strain Y4305 biomass.

Specifically, the reference oil was produced from dried and untreated *Yarrowia lipolytica* strain Y4305 biomass, according to the methodology set forth in Example 1A. Strain Y4305, capable of producing 55.6 EPA % TFAs, is described in U.S. Pat. Appl. Pub. No. 2009-0093543 A1. The dried and untreated biomass was mechanically disrupted using a media mill with an oil to iso-hexane solvent ratio of 1 to 7. The residual biomass (i.e., cell debris) was removed using a decanter centrifuge and the solvent was evaporated to yield an extracted oil containing triglycerides. The extracted oil was degummed using cold acetone with an extracted oil to solvent ratio of 1 to 1.5, followed by acid degumming with 50% aqueous citric acid. The degummed oil was then bleached with an acid-activated clay and deodorized at 210° C. for 30 min to yield the reference oil sample.

None of the chromatographic profiles of the SPD-purified oil of Pass 3 contained any peaks that were not seen in the profile of the reference sample. Both samples were run on the same day under the same conditions. Additionally, there were no unidentified peaks in of the SPD-purified oil that had significantly higher responses than the corresponding peaks in the profile of the reference sample. Also, none of the peaks in the SPD-purified oil of Pass 3 had higher responses than the corresponding peaks in the SPD-purified oil of Pass 1 or Pass 2, which were produced at lower temperatures (i.e., 210° C. and 240° C., respectively). These analyses show that the removal of ergosterol at high temperatures using SPD does not lead to the appearance of degradation products in the oil; thus, it is hypothesized that no significant degradation of the PUFAs occurs by application of this processing technique.

Example 3

Preparation of a SPD-Purified Microbial Oil Having Reduced Sterol Content from Untreated *Yarrowia lipolytica* Strain Y8672 Biomass The present Example describes means used to disrupt dried and untreated *Yarrowia lipolytica* strain Y8672 biomass via mechanical disruption using a media mill, extract the crude oil using iso-hexane solvent, and reduce the sterol content of the acetone-degummed oil by distillation, using short path distillation conditions.

Genotype of *Yarrowia lipolytica* Strain Y8672

The generation of strain Y8672 is described in U.S. Pat. Appl. Pub. No. 2010-0317072-A1. Strain Y8672, derived from *Yarrowia lipolytica* ATCC #20362, was capable of producing about 61.8% EPA relative to the total lipids via expression of a delta-9 elongase/delta-8 desaturase pathway.

The final genotype of strain Y8672 with respect to wild type *Yarrowia lipolytica* ATCC #20362 was Ura+, Pex3-, unknown 1-, unknown 2-, unknown 3-, unknown 4-, unknown 5-, unknown 6-, unknown 7-, unknown 8-, Leu+, Lys+, YAT1::ME3S::Pex16, GPD::ME3S::Pex20, GPD::FmD12::Pex20, YAT1::FmD12::Oct, EXP1::FmD12S::ACO, GPAT::EgD9e::Lip2, FBAINm::EgD9eS::Lip2, EXP1::EgD9eS::Lip1, YAT1::EgD9eS::Lip2, FBAINm::EgD8M::Pex20, FBAIN::EgD8M::Lip1, EXP1::EgD8M::Pex16, GPD::EaD8S::Pex16 (2 copies), YAT1::E389D9eS/EgD8M::Lip1, YAT1::EgD9eS/EgD8M::Aco, FBAIN::EgD5SM::Pex20, YAT1::EgD5SM::Aco, GPM::EgD5SM::Oct, EXP1::EgD5M::Pex16, EXP1::EgD5SM::Lip1, YAT1::EaD5SM::Oct, YAT1::PaD17S::Lip1, EXP1::PaD17::Pex16, FBAINm::PaD17::Aco, GPD::YICPT1::Aco, and YAT1::MCS::Lip1. Abbreviations are as defined in Example 1A.

For a detailed analysis of the total lipid content and composition in strain Y8672, a flask assay was conducted wherein cells were grown in 2 stages for a total of 7 days. Based on analyses, strain Y8672 produced 3.3 g/L dry cell weight ["DCW"], total lipid content of the cells was 26.5 ["TFAs % DCW"], the EPA content as a percent of the dry cell weight ["EPA % DOW"] was 16.4, and the lipid profile was as follows, wherein the concentration of each fatty acid is as a weight percent of TFAs ["% TFAs"]: 16:0 (palmitate)-2.3, 16:1 (palmitoleic acid)—0.4, 18:0 (stearic acid)—2.0, 18:1 (oleic acid)—4.0, 18:2 (LA)—16.1, ALA—1.4, EDA—1.8, DGLA—1.6, ARA—0.7, ETrA—0.4, ETA—1.1, EPA—61.8, other—6.4.

Preparation of Dried and Untreated *Yarrowia lipolytica* Strain Y8672 Biomass

*Yarrowia lipolytica* strain Y8672 was cultured in a 2-stage fed-batch process and the resulting microbial biomass was dewatered, washed and dried, according to the methodology set forth in Example 1A.

Disruption and Extraction Via Media Mill and Iso-Hexane Solvent of Dried, Untreated Yeast Biomass to Produce Extracted Oil The dried and untreated *Yarrowia lipolytica* strain Y8672 biomass was mechanically disrupted using a media mill with iso-hexane solvent. The residual biomass (i.e., cell debris) was removed using a decanter centrifuge and the solvent was evaporated to yield an extracted oil containing triglycerides.

The extracted oil was analyzed using the methodology of Example 1B. The microbial oil contained 58.1 EPA % TFAs, as shown in Table 10.

TABLE 10

Fatty Acid Composition of Extracted Y8672 Microbial Oil

| Fatty acid | Weight Percent Of Total Fatty Acids |
|---|---|
| C18:2 (omega-6) | 15.6 |
| C20:5 EPA | 58.1 |
| C22:6 DHA | non-detectable |
| Other components | 26.3 |

A portion of the extracted oil was degummed using cold acetone with a extracted oil to solvent ratio of 1 to 1.5. The acetone-degummed oil contained 880 mg ergosterol/100 g oil and 74.5 ppm of phosphorous.

Distillation Under SPD Conditions

The acetone-degummed oil was subjected to short path distillation, according to the methodology of Example 1B (except the evaporator temperature was set at 255° C.). Almost no distillate was collected during the first pass since there was very little water in the acetone-degummed oil. During the second pass, roughly 12 wt. % of distillate was collected. The final ergosterol level in the triacylglycerol-containing fraction (i.e., the SPD-purified oil) was 106 mg/100 g (a ~88% reduction in ergosterol content, when compared to ergosterol content in the acetone-degummed oil); the SPD-purified oil contained 66 ppm of phosphorous.

We claim:

1. A process for reducing the amount of sterol in a sterol-containing microbial oil composition obtained from microbial biomass of recombinant *Yarrowia* cells, said method comprising:
   a) distilling, at least once under short path distillation conditions, the sterol-containing microbial oil composition, wherein said oil composition comprises:
      (i) triacylglycerol comprising one or more polyunsaturated fatty acids; and
      (ii) a sterol fraction of at least 300 mg/100 g of oil, wherein the sterol fraction comprises one or more sterols selected from the group consisting of stigmasterol, ergosterol, brassicasterol, campesterol, beta-sitosterol, and desmosterol;
   wherein said distillation produces a distillate fraction comprising the sterol and a triacylglycerol-containing fraction having a reduced amount of the sterol when compared to the amount of sterol in the sterol-containing microbial oil composition that has not been subjected to short path distillation; and
   b) optionally, recovering the triacylglycerol-containing fraction;
   wherein said *Yarrowia* cells are engineered for production of eicosapentaenoic acid and at least 20% of the dry cell weight of said *Yarrowia* cells is eicosapentaenoic acid.

2. The process of claim 1, wherein the short path distillation conditions comprise at least one pass of the sterol-containing microbial oil composition at a vacuum level of not more than 30 mTorr and a temperature of not more than 300° C.

3. The process of claim 1, wherein the sterol fraction comprises ergosterol.

4. The process of claim 1, wherein the reduction in the amount of sterols in the triacylglycerol-containing fraction is at least 40% when compared to the amount of sterols in the sterol-containing microbial oil composition.

5. The process of claim 1, wherein the triacylglycerol-containing fraction has improved clarity when compared to the sterol-containing microbial oil composition that has not been subjected to short path distillation.

6. The process of claim 2, wherein the temperature is not more than 280° C.

7. The process of claim 1, wherein the sterol-containing microbial oil composition is a refined lipid composition having less than 20 ppm phosphorous as determined with inductively coupled plasma optical emission spectroscopy.

8. The process of claim 1, wherein the recombinant *Yarrowia* cells are further engineered for production of at least one polyunsaturated fatty acid selected from the group consisting of: linoleic acid, gamma-linolenic acid, eicosadienoic acid, dihomo-gamma-linolenic acid, arachidonic acid, docosatetraenoic acid, omega-6 docosapentaenoic acid, alpha-linolenic acid, stearidonic acid, eicosatrienoic acid, eicosatetraenoic acid, omega-3 docosapentaenoic acid, docosahexaenoic acid, and mixtures thereof.

9. The process of claim 1, wherein said distilling comprises two or more consecutive short path distillations of the microbial oil composition.

10. The process of claim 9, wherein each consecutive short path distillation is at a temperature that is higher than the temperature of the immediately preceding short path distillation.

\* \* \* \* \*